United States Patent
Stockem et al.

(10) Patent No.: US 12,323,078 B2
(45) Date of Patent: Jun. 3, 2025

(54) METHOD FOR CONTROLLING A PLANAR DRIVE SYSTEM, AND PLANAR DRIVE SYSTEM

(71) Applicant: Beckhoff Automation GmbH, Verl (DE)

(72) Inventors: Irina Stockem, Gütersloh (DE); Viktor Balzer, Herford (DE); Keir Maguire, North Vancouver (CA); Xiaodong Zhang, Burnaby (CA)

(73) Assignee: Beckhoff Automation GmbH, Verl (DE)

( * ) Notice: Subject to any disclaimer, the term of this patent is extended or adjusted under 35 U.S.C. 154(b) by 168 days.

(21) Appl. No.: 18/315,747

(22) Filed: May 11, 2023

(65) Prior Publication Data

US 2023/0283212 A1    Sep. 7, 2023

Related U.S. Application Data

(63) Continuation of application No. PCT/EP2021/082169, filed on Nov. 18, 2021.

(30) Foreign Application Priority Data

Nov. 20, 2020 (DE) ..................... 10 2020 130 795.0

(51) Int. Cl.
*H02P 1/00* (2006.01)
*H02K 41/03* (2006.01)
*H02P 25/064* (2016.01)

(52) U.S. Cl.
CPC ......... *H02P 25/064* (2016.02); *H02K 41/031* (2013.01); *H02K 2201/18* (2013.01)

(58) Field of Classification Search
CPC ....... H02P 25/064; H02P 25/066; H02P 31/00
See application file for complete search history.

(56) References Cited

U.S. PATENT DOCUMENTS

| 6,445,093 B1 | 9/2002 | Binnard |
| 10,348,177 B2 | 7/2019 | Lu |

(Continued)

FOREIGN PATENT DOCUMENTS

| DE | 102017131304 A1 | 6/2019 | |
| DE | 102018129731 A1 * | 5/2020 | ........... H02K 41/031 |

(Continued)

OTHER PUBLICATIONS

Berkelman, et al. "Magnet Levitation and Trajectory Following Motion Control Using a Planar Array of Cylindrical Coils," Proceedings of DSCC2008, 2008 ASME Dynamic Systems and Control Conference, Oct. 20, 2008, 8 pgs.

(Continued)

*Primary Examiner* — Karen Masih
(74) *Attorney, Agent, or Firm* — Dorsey & Whitney LLP

(57) ABSTRACT

A method for controlling a planar drive system with a stator unit and a rotor includes moving the rotor to a rotational position on the stator unit. In the rotational position, each magnet unit of the rotor covers a coil group of the stator unit which is not covered by any other magnet unit of the rotor, in each orientation of the rotor relative to the stator unit. The method includes actuating the coil groups which are covered by the magnet units of the rotor in the rotational position, generating a stator magnetic field by each actuated coil group, and rotating the rotor about an axis oriented perpendicular to a surface of the stator unit by a predetermined angle, by way of the stator magnetic fields of the actuated coil groups covered by the magnet units of the rotor. A planar drive system is adapted to perform the method.

15 Claims, 8 Drawing Sheets

(56) References Cited

U.S. PATENT DOCUMENTS

| | | |
|---|---|---|
| 11,437,902 B2 | 9/2022 | Brinkmann et al. |
| 2021/0328493 A1 | 10/2021 | Luthe et al. |

FOREIGN PATENT DOCUMENTS

| | | | | |
|---|---|---|---|---|
| EP | 2904695 B1 * | 12/2016 | ........... | H02K 41/031 |
| WO | 2013112759 A1 | 8/2013 | | |
| WO | 2015188281 A1 | 12/2015 | | |

OTHER PUBLICATIONS

International Search Report and Written Opinion dated Feb. 14, 2022 in connection with International Patent Application No. PCT/EP2021/082169, 19 pages.

Office Action dated Oct. 6, 2021 in connection with German patent application No. DE 10 2020 130 795.0, 8 pages Including English translation.

* cited by examiner

METHOD FOR CONTROLLING A PLANAR DRIVE SYSTEM, AND PLANAR DRIVE SYSTEM

CROSS-REFERENCE TO RELATED APPLICATIONS

This patent application is a continuation of International Patent Application No. PCT/EP2021/082169, filed Nov. 18, 2021, entitled METHOD FOR CONTROLLING A PLANAR DRIVE SYSTEM, AND PLANAR DRIVE SYSTEM, which claims the priority of German patent application DE 10 2020 130 795.0, filed Nov. 20, 2020, entitled VERFAHREN ZUM STEUERN EINES PLANARANTRIEBSSYSTEMS UND PLANARANTRIEBSSYSTEM, each of which is incorporated by reference herein, in the entirety and for all purposes.

FIELD

The application provides a method for controlling a planar drive system and a planar drive system that is adapted to carry out the method for controlling a planar drive system.

BACKGROUND

Planar drive systems can be used, inter alia, in automation technology, particularly in manufacturing technology, handling technology, and process technology. A movable element of a system or machine can be moved or positioned in at least two linearly independent directions by planar drive systems. Planar drive systems can comprise a permanently excited electromagnetic planar motor with a planar stator and a rotor that can move in at least two directions on the stator.

In a permanently excited electromagnetic planar motor, a driving force is applied to the rotor in that energized coil groups of the stator unit interact magnetically with drive magnets of multiple magnet arrangements of the rotor.

Planar drive systems with rectangular and elongated coil groups and rectangular and elongated magnet units of the rotor are known from the prior art. Such a planar drive system is described in DE 10 2017 131 304 A1. Planar drive systems with rectangular and elongated coil groups and rectangular and elongated magnet units of the rotor are advantageous for the linear translational movement of the rotor.

Planar drive systems with round coil groups are known from the prior art, Proceedings of DSCC2008 2008 ASME Dynamic Systems and Control Conference, Oct. 20-22, 2008, Ann Arbor, Michigan, USA. Round coil groups are advantageous for the rotation of the rotor, but have significant disadvantages in the linear translational movement of the rotor and can lead to unsteady and jerky movements.

In a planar drive system with rectangular and linearly arranged coil groups and magnet units, the rotor comprises at least a first magnet unit for driving the rotor in a first direction and a second magnet unit for driving the rotor in a second direction which is linearly independent of the first direction, for example in a second direction orthogonal to the first direction. The planar stator unit comprises energizable first coil groups, which magnetically interact with the magnets of the first magnet unit to drive the rotor in the first direction, and energizable second coil groups, which magnetically interact with the magnets of the second magnet unit to drive the rotor in the second direction. The first and second coil groups can generally be energized independently of one another to enable independent movements of the rotor in the first and second directions. If the conductors of the first and second groups can be supplied with current independently of one another, at least in part, multiple rotors can be moved independently of one another on one stator at the same time.

In order to control a rotor of a planar drive system, it can be crucial for specific applications to bring about a change in the orientation of the rotor relative to the stator unit in addition to a change in position of the rotor, which occurs primarily through translational movements along the first and second directions. To do this, it is necessary to be able to rotate the rotor about an axis of rotation oriented perpendicular to a surface of the stator unit. Due to the linear arrangement of the coil groups and the characteristic interaction between the coil groups and the magnet units, however, rotations of the rotor are difficult and limited to only a few degrees.

SUMMARY

An improved method for controlling a planar drive system which enables improved orientation of the rotor. Further a planar drive system that is adapted to carry out the method for controlling a planar drive system is provided.

EXAMPLES

According to one aspect, a method for controlling a planar drive system is provided wherein the planar drive system comprises a stator unit with a plurality of coil groups for generating a stator magnetic field and a rotor with a plurality of magnet units for generating a rotor magnetic field, wherein the rotor can be driven on the stator unit via magnetic coupling between the stator magnetic field and the rotor magnetic field, wherein the plurality of coil groups comprises rectangular X coil groups and rectangular Y coil groups, wherein the X coil groups are aligned along an X direction of the stator unit and the Y coil groups are aligned along a Y direction of the stator unit that is perpendicular to the X direction, wherein the plurality of magnet units of the rotor comprises rectangular X magnet units and rectangular Y magnet units, and wherein the X magnet units are aligned along an X direction of the rotor, with the Y magnet units aligned along a Y direction of the rotor that is perpendicular to the X direction. The method comprises:

Moving the rotor into a rotational position of the rotor on the stator module in a movement step, wherein each magnet arrangement of the rotor covers a coil group of the stator unit that is not covered by any other magnet arrangement of the rotor, in the rotational position, in each orientation of the rotor relative to the stator unit;

Actuating the coil groups which are covered by the magnet arrangements of the rotor in the rotational position and generating a stator magnetic field by each actuated coil group in an actuation step; and Rotating the rotor about an axis of rotation that is oriented perpendicular to a stator surface of the stator unit by a predetermined angle of rotation by way of the stator magnetic fields of the driven coil groups covered by the magnet units of the rotor in a rotation step.

In this way, the technical advantage can be achieved that an improved method for controlling a planar drive system can be provided, in which rotation of the rotor about an axis of rotation oriented perpendicular to a stator surface of a stator unit of the planar drive system by any angle of rotation is made possible. For this purpose, the rotor is moved to a rotational position on the stator unit and rotated in this rotational position by a predetermined angle of rotation by controlling suitable coil groups of the stator unit. The rotational position is characterized in that, in the rotational position, there is at least one coil group of the stator unit for each magnet unit of the rotor, which is covered exclusively by the respective magnet unit of the rotor. In this way, the advantage can be achieved that only the magnet unit of the rotor that covers the respective coil group is influenced by actuating the respective coil group and the magnetic field generated by actuating said coil group.

Covering a coil group of the stator unit by a magnet unit of the rotor is achieved if, in any position of the rotor on the stator unit, a magnet unit of the rotor is at least partially arranged above a coil group.

If a coil group is exclusively covered by only one magnet unit of the rotor in a specific position, no other magnet unit of the rotor is arranged at least partially above the respective coil group in the respective position. When the rotor rotates in the rotational position, the positioning of the individual magnet units of the rotor changes due to the rotation of the rotor, such that the magnet units are arranged above different coil groups in the course of the rotation. For different orientations of the rotor in the rotational position, each magnet unit can be arranged above different coil groups. The coil group that is exclusively covered by a magnet unit and is therefore not covered by any other magnet unit can therefore be different for different orientations of the rotor.

Due to the geometry of the planar drive system with the rectangular and elongated coil groups arranged as X coil groups and Y coil groups in two perpendicularly oriented directions on the stator unit, and the rectangular and elongated magnet units arranged as X magnet units and Y magnet units in two perpendicularly oriented directions on the rotor, the result for the rotational position exclusively is that, in every orientation of the rotor for each magnet unit, there is a coil group that is exclusively covered by this magnet unit.

However, due to the symmetry of the stator unit, there can be a plurality of corresponding rotational positions on the stator unit.

Due to the rectangular configuration of both the coil groups and the magnet units and the orientation of the coil groups along the two mutually perpendicular X and Y directions in the stator unit or the orientation of the magnet units along the two mutually perpendicular X and Y directions of the rotor, respectively, the result for any position of the rotor that is not the rotational position is that there is not a coil group that is exclusively covered by the respective magnet unit for every orientation of the rotor relative to the stator unit and for each magnet unit of the rotor.

Instead, for any positions that are not the rotational position, the magnet units of the rotor exclusively cover coil groups that are covered by multiple magnet units of the rotor in a specific orientation of the rotor. Due to the multiple overlapping of a coil group by multiple magnet units, actuation of the respective coil group affects all magnet units of the rotor that cover the respective coil group. This can result in rotation of the rotor being inhibited or prevented by differently aligned magnetic fields from different coil groups acting on the magnet units of the rotor. Due to the geometry of the rotor or the arrangement of the individual magnet units, this can prevent opposite sides of the rotor from being moved in opposite directions, which is crucial for rotation of the rotor.

Since there is a coil group for each magnet unit in the rotational position for each orientation of the rotor, which coil group is covered exclusively by the respective magnet unit, each magnet unit can be influenced by the magnetic field of the coil group covered by this magnet unit by actuating the respective coil groups covered by only one magnet unit.

As a result, each magnet unit can be subjected to a corresponding magnetic force by appropriate actuation of the coil group covered by this magnet unit, wherein the magnetic forces acting on the corresponding magnet units can be generated independently of one another by appropriate actuation of the corresponding coil groups. Due to the action of independent magnetic forces, thus possibly pointing in different directions, on the various magnet units of the rotor, a rotation of the rotor relative to the stator unit can be achieved for any orientation of the rotor. The rotor can thus be rotated by any desired angle of rotation.

BRIEF DESCRIPTION OF THE DRAWINGS

The invention will be explained in greater detail with reference to the accompanying figures. Wherein.

DETAILED DESCRIPTION

Figure 1:
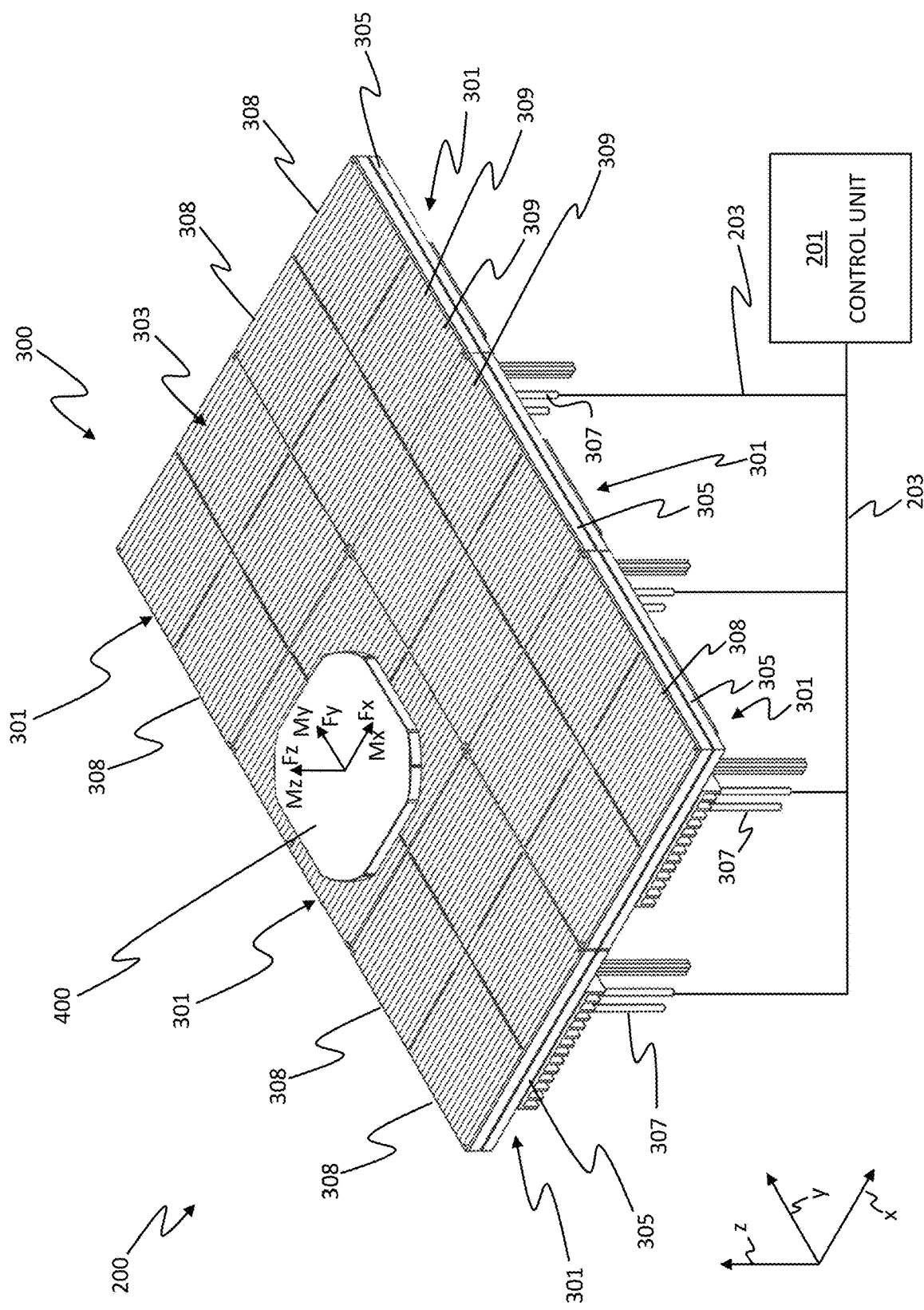
FIG. 1 shows a schematic representation of a planar drive system with a stator unit and a rotor.

Within the meaning of the application, an orientation of the rotor is an alignment of a preferred direction of the rotor relative to the X and Y directions of a coordinate system spanned by the stator unit. A change in the orientation of the rotor can be achieved by rotating about an axis of rotation oriented parallel to the Z axis of the coordinate system spanned by the stator unit.

Within the meaning of the application, a position of the rotor is a position of the rotor on the stator unit. A change in position of the rotor can be achieved by a translational movement along the X and Y directions of the stator unit. A position of the rotor can be determined in particular by positioning a center of the rotor on the stator unit.

In the meaning of the application, an angle of rotation is a solid angle between the preferred direction of the rotor and the X or Y direction of the coordinate system spanned by the stator unit.

According to a second aspect, a planar drive system is provided wherein the planar drive system comprises a stator unit with a plurality of coil groups for generating a stator magnetic field, at least one rotor with a plurality of magnet units for generating a rotor magnetic field, and a control unit for controlling the planar drive system, wherein the rotor can be driven on the stator unit via magnetic coupling between the stator magnetic field and the rotor magnetic field, wherein the plurality of coil groups comprises rectangular X coil groups and rectangular Y coil groups, wherein the X coil groups are aligned along an X direction of the stator unit and the Y coil groups are aligned along a Y direction of the stator unit that is perpendicular to the X direction, wherein the plurality of magnet units of the rotor comprises rectangular-shaped X magnet units and rectangular-shaped Y magnet units, wherein the X magnet units are aligned along an X direction of the rotor, wherein the Y magnet units are aligned along a Y direction of the rotor that is perpendicular to the X direction, and wherein the planar drive system is adapted to carry out method for controlling a planar drive system.

As a result, the technical advantage can be achieved that a planar drive system can be provided with the stated advantages of the method for controlling the planar drive system.

According to an embodiment, the stator unit comprises a plurality of stator segments, wherein the stator segments are rectangular and arranged in pairs next to one another in the X direction or Y direction, wherein each stator segment comprises X coil groups and Y coil groups which are separated from X coil groups and Y coil groups of other stator segments, and wherein the rotational position is a position on the stator unit in which four stator segments are adjacent to each other.

As a result, the technical advantage of precise actuation of the coil groups required for rotating the rotor in the rotational position can be achieved. In this way, a precise rotation of the rotor can be brought about. By positioning the rotor, or in particular the center of the rotor, at a point of contact between four adjacent stator segments, the coil groups which are covered exclusively by one magnet unit of the rotor are each arranged in one of the four adjacent stator segments, due to the arrangement of the individual magnet units of the rotor. Since the individual coil groups of the four adjacent stator segments can be actuated independently, individual actuation of the coil groups of the individual stator segments covered by the magnet units is made possible. Each magnet unit of the rotor can thus be subjected to an individual magnetic force by appropriately actuating the corresponding coil groups of the individual stator segments, such that the rotor can rotate about the axis of rotation oriented toward the Z axis of the coordinate system spanned by the stator unit.

Within the meaning of the application, stator segments are characterized in that X coil groups and Y coil groups extend over the entire length or width of the stator segment. X coil groups of stator segments arranged next to one another in the X direction can be arranged in one line in the X direction but can still be coil groups that are separated from one another. The same applies to Y coil groups.

This makes it possible that coil groups arranged in one line can be actuated separately from one another.

In the embodiment mentioned, the stator segments are arranged in such a way that each stator segment has at least one stator segment which is adjacent in the X direction and at least one stator segment which is adjacent in the Y direction.

According to an embodiment, the actuation step comprises:
Energizing each of the coil groups covered by the magnet units by individual energizing in a first energizing step.

In this way, the technical advantage can be achieved that precise control of the coil groups required for rotating the rotor in the rotational position and, associated therewith, precise rotation of the rotor by a predetermined angle of rotation are made possible. Since the coil groups covered by the magnet units of the rotor in the rotational position are actuated individually, the stator magnetic fields generated by the respective coil groups can be individually adjusted. By adjusting the stator magnetic fields generated by the respective coil groups, the magnetic forces acting on the individual magnet units of the rotor can be adjusted individually, such that a total of the magnetic forces acting on the individual magnet units of the rotor cause the rotor to rotate about the axis of rotation. Individual actuation of the respectively selected coil groups can also prevent additional coil groups from being actuated whose stator magnetic fields may impede rotation of the rotor by having an adverse effect on the individual magnet units of the rotor.

According to the application, individual actuation of a coil group is the energizing of the coil group with an individual excitation current. The excitation currents of two individually energized coil groups can differ in at least one value.

According to an embodiment, the actuation step comprises:
Determining a magnetic force acting on a magnet unit covering the coil group by a stator magnetic field of a coil group in a force determination step;
Determining an individual energization for each of the coil groups covered by the magnet units in an energization determining step, such that a torque of the rotor about the axis of rotation is generated by a total of the magnetic forces acting on the magnet units by the stator magnetic fields according to the individual energization of the coil groups, causing the rotor to rotate by the angle of rotation.

In this way, the technical advantage can be achieved that precise actuation and energization of the coil groups and, associated therewith, precise rotation of the rotor about the axis of rotation can be achieved. First, a magnetic force which acts on the respective magnet unit by the stator magnetic field of a coil group energized with a specific current is therefore determined for each magnet unit. After recognizing the relationship between energization of the respective coil group and the magnetic force acting on the respective magnet unit by the magnetic field of the energized coil group, the coil groups covered by the magnet units of the rotor in the rotational position are individually energized in such a way that the entirety of the magnetic forces acting on the magnet units lead to a torque acting on the rotor, which is adapted to rotate the rotor by the predetermined angle of rotation. By determining these relationships between the individual energization of the individual coil groups and the rotation to be achieved by the desired angle of rotation, precise energization of the individual coil groups can be achieved for rotations of any desired angle of rotation. As a result, precise control and, in particular, precise rotation of the rotor can be effected.

According to an embodiment, the force determination step comprises:
calculating the torque required for the rotation by the predetermined rotation angle in a torque calculation step;
calculating the magnetic forces required to generate the torque and acting on the individual magnet units of the rotor in a force calculation step; and wherein the energization determining step comprises:
calculating of the individual energizations of the coil groups necessary to generate the calculated magnetic forces in an energization calculation step.

In this way, the technical advantage can be achieved that the magnetic forces acting on the individual magnet units of the rotor can be precisely determined and, associated therewith, the current flow that leads to the rotor rotating by a predetermined angle of rotation can be precisely determined. For this purpose, the torque that has to act on the rotor for such a rotation is first calculated for a predetermined angle of rotation by which the rotor is to be rotated. Based on this, the individual magnetic forces that must act on the respective magnet units of the rotor are calculated, such that the entirety of the magnetic forces acting on the magnet units lead to the previously determined torque. In this way, a precise determination of the magnetic forces acting on the individual magnet units can be determined for any angle of rotation. The required magnetic force which leads to a rotation by the predetermined angle of rotation, is thus determined for any rotation angle for each magnet unit of the rotor in the rotation position.

In addition, a relation is calculated between the individual energization of the coil groups covered by the magnet units of the rotor in the rotational position and the magnetic forces acting on the respective magnet units of the stator magnetic fields generated by the respective energized coil groups. A required energization is thus determined for any angle of rotation for each of the coil groups covered by the magnet units of the rotor in the rotational position. The relation created in this way between rotation by a predetermined angle of rotation and individual energization of the coil groups covered by the magnet units of the rotor in the rotational position can be stored in a corresponding database, for example. By calculating the required current supply for each of the coil groups covered by the magnet units of the rotor in the rotational position, precise control of the coil groups and, associated therewith, precise rotation of the rotor can be achieved.

The calculation of the required torque can take into account factors such as the dimensions, weight, load, or other properties of the rotor.

The calculation of the current required to generate the desired torque can take into account factors such as the dimensions and magnetic properties of the magnet units or the rotor magnetic field and the associated properties of the magnetic coupling between the stator magnetic field and the rotor magnetic field. For this purpose, in particular the flight height of the rotor, i.e., the distance in the Z direction between the magnet unit and the coil group, can be taken into account.

According to an embodiment, the calculations of the torque and the forces in the force determination step and of the energizations in the energization determination step are performed by a control unit of the planar drive system during control of the rotor.

This can achieve the technical advantage that rapid control of the rotor is made possible in that the current supply values required for rotating the rotor by the predetermined angle of rotation of the individual coil groups which are covered by the magnet units of the rotor are calculated immediately during movement of the rotor or during control of the rotor. Thus, immediately after determining the angle of rotation by which the rotor is to be rotated, the rotation can be achieved by corresponding energization of the individual coil groups accordingly.

According to an embodiment, the calculations of the torque and/or the forces in the force determination step and/or the energizations in the energization determination step comprise simulations, wherein the simulations are based on a model description of a relationship between energization of the coil groups and magnetic forces acting on the magnet units and/or on a model description of a relationship between the energization of the coil groups and the torque acting on the rotor.

As a result, the technical advantage can be achieved that a precise control of the rotor and in particular a precise rotation of the rotor can be provided. In particular, computing power of the control unit of the planar drive system can be saved by using a previously performed simulation based on a model description of the relationship between the current supply of the coil groups and the magnetic forces acting on the magnet units and the rotation by the predetermined angle of rotation associated therewith is carried out. The results of the simulation can be stored in a database or a look-up table, for example, such that the individual energizations required for the individual coil groups covered by the rotor are not calculated again by the control unit to rotate the rotor by a predetermined angle of rotation, but only have to be read out from the database or look-up table. This can save calculation time and computing capacity of the control unit for performing the rotation of the rotor.

According to an embodiment, the movement step comprises:

Determination of the coil groups of the stator unit, which are covered by the magnet arrangements of the rotor, in a coil determination step.

As a result, the technical advantage can be achieved that precise control of the rotor is achieved in that only the coil groups that are required for moving or rotating the rotor are actuated or energized. For this purpose, the coil groups are determined that are covered by the magnet units of the rotor in the rotational position. These can obviously differ depending on the current position of the rotor on the stator unit, the desired direction of movement of the rotor, and the current orientation of the rotor relative to the stator unit. After determining the coil groups covered by the magnet units of the rotor, only these are actuated and energized to move the rotor. In this case, the movement of the rotor can comprise a linear translational movement or a rotation. In the case of a rotation, actuation of coil groups which impede or inhibit rotation of the rotor due to the respective orientation of the corresponding magnetic fields can be avoided by selecting the appropriate coil groups.

According to an embodiment, the coil determination step comprises:

detecting the rotor magnetic fields of the individual magnet arrangements of the rotor in the rotational position by magnetic field sensors of the stator unit in a detection step;

defining an overlap area for each magnet arrangement in a definition step, wherein the overlap area characterizes an area of the stator unit which comprises the magnetic field sensors detecting the rotor magnetic field of the respective magnet arrangement; and determining the coil groups that are at least partially arranged in an overlap area in a determination step.

In this way, the technical advantage can be achieved that a precise determination of the coil groups and, associated therewith, a precise control of the rotor is made possible. To determine the coil groups covered by the magnet units of the rotor, the rotor magnetic fields of the individual magnet units of the rotor are detected by measurements from magnetic field sensors in the stator unit. The individual magnet units of the rotor can thus be positioned precisely relative to the magnetic field sensors on the basis of the rotor magnetic fields. An overlap area is then defined, which describes an area of the stator unit that is covered by one of the magnet units of the rotor. The overlap area can be defined for each magnet unit of the rotor. Coil groups that are at least partially arranged in the overlap areas are then determined as coil groups that are covered by the respective magnet units of the rotor. By measuring the rotor magnetic fields of the individual magnet units, the corresponding coil groups covered by magnet units can be determined for each position and orientation of the rotor. Precise control of the rotor can be achieved by only actuating the covered coil groups.

According to an embodiment, the movement step comprises:

energizing a plurality of coil groups with a common desired energization in a second energization step.

In this way, the technical advantage can be achieved that a simplification of the control and a more precise control of the rotor are made possible. The control process can be simplified because an individual current flow does not have to be determined or calculated for each coil group because several coil groups are supplied with a common target current flow during the exclusively linear movement of the rotor, in which the rotor is moved in a linear translational movement. In addition, computing capacity of the control unit can be saved by the common energization of the coil groups to be energized for moving the rotor.

According to an embodiment, the rotor comprises two X magnet units and two Y magnet units, wherein the X magnet units are arranged in the Y direction on opposite sides of the rotor and the Y magnet unit are arranged in the X direction on opposite sides of the rotor, and wherein at least four coil groups are covered by the magnet units depending on the rotational position, and each of the four coil groups is arranged in a respective stator segment.

In this way, the technical advantage can be achieved that a precise rotation of the rotor is brought about by individually actuating and energizing the coil groups covered by the magnet units of the rotor in the rotational position. Because the four magnet units of the rotor cover four coil groups of the stator unit in the rotational position, which coil groups are covered exclusively by one magnet unit and are each arranged in four separate stator segments, each coil group can be individually actuated and energized with precision.

In the embodiment mentioned, each of the four magnet units of the rotor covers a coil group in the rotational position, which is not covered by any other magnet unit. Four coil groups are thus exclusively covered by the totality of the four magnet units. The four coil groups are arranged in the four adjacent stator segments, wherein exactly one of the four exclusively covered coil groups is arranged in each stator segment.

According to an embodiment, the angle of rotation can be selected for any value between 0° and 360°.

As a result, the technical advantage of improved rotation of the rotor and, associated therewith, improved control of the rotor can be brought about. The method according to the application can cause the rotor to rotate by any desired angle of rotation between 0° and 360°. A repeated revolution of the rotor, which includes a multiple of the angles of rotation described here, is also covered by the application. Also included are rotations in opposite directions.

According to an embodiment, an X coil group is adapted to generate a stator magnetic field with a Y component and a Z component, wherein a Y coil group is adapted to generate a stator magnetic field with an X component and a Z component, wherein an X component is aligned along the X direction, a Y component is aligned along the Y direction, and a component is aligned along a direction of the stator unit which is oriented perpendicular to the X direction and to the Y direction.

In this way, the technical advantage can be achieved that improved control of the rotor is made possible. A stator magnetic field with a Y component and a Z component is generated by the X coil groups aligned along the X direction of the coordinate system spanned by the magnet unit, while a stator magnetic field with an X component and a Z component is generated by the Y coil groups aligned along the Y direction. By energizing the individual X and Y coil groups, a magnetic force can act in the Z direction on the rotor to be controlled, causing the rotor to move in the Z direction or causing the rotor to float above the stator surface of the stator unit. In addition, magnetic forces can act on the controlling rotor in the X or Y direction or any combined direction, causing a corresponding translational movement of the rotor within the XY plane of the coordinate system spanned by the stator unit. This allows precise movement of the rotor in the form of an arbitrarily configured translational movement.

According to an embodiment, an X coil group is adapted to generate a rotor magnetic field with a Y component and a Z component, wherein a Y coil group is adapted to generate a rotor magnetic field with an X component and a Z component, wherein an X component is aligned along the X direction, a Y component is aligned along the Y direction, and a component is aligned along a direction of the rotor which is oriented perpendicular to the X direction and to the Y direction.

In this way, the technical advantage can be achieved that precise control of the rotor is made possible. Coupling between the stator magnetic fields of the X coil groups and the rotor magnetic fields of the X magnet units can be achieved by the stator magnetic field with Y and Z components of the X magnet units and with parallel alignment of the X magnet units to the X coil groups of the stator unit. This allows the rotor to be controlled in the Y direction of the stator unit. Coupling of the stator magnetic fields of the Y coil groups and the rotor magnetic fields of the Y magnet units can be achieved and control of the rotor can be effected in the X direction of the stator unit by the rotor magnetic fields with X and Z components of the Y magnet units and with parallel alignment of the Y magnet units to the Y coil groups. This allows precise control of the rotor.

FIG. 1 shows a schematic view of a planar drive system 200 with a stator unit 300 and a rotor 400.

According to the embodiment in FIG. 1, the planar drive system comprises a control unit 201, a stator unit 300, and a rotor 400. The control unit 201 is connected to the stator unit 300 via a data connection 203. The control unit 201 is adapted to carry out a method 100 for controlling a planar drive system 200.

Figure 8:
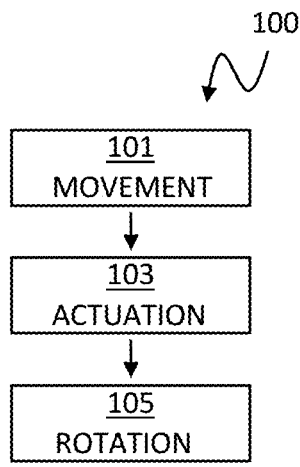
FIG. 8 shows a flow diagram of a method for controlling a planar drive system.
Figure 9:
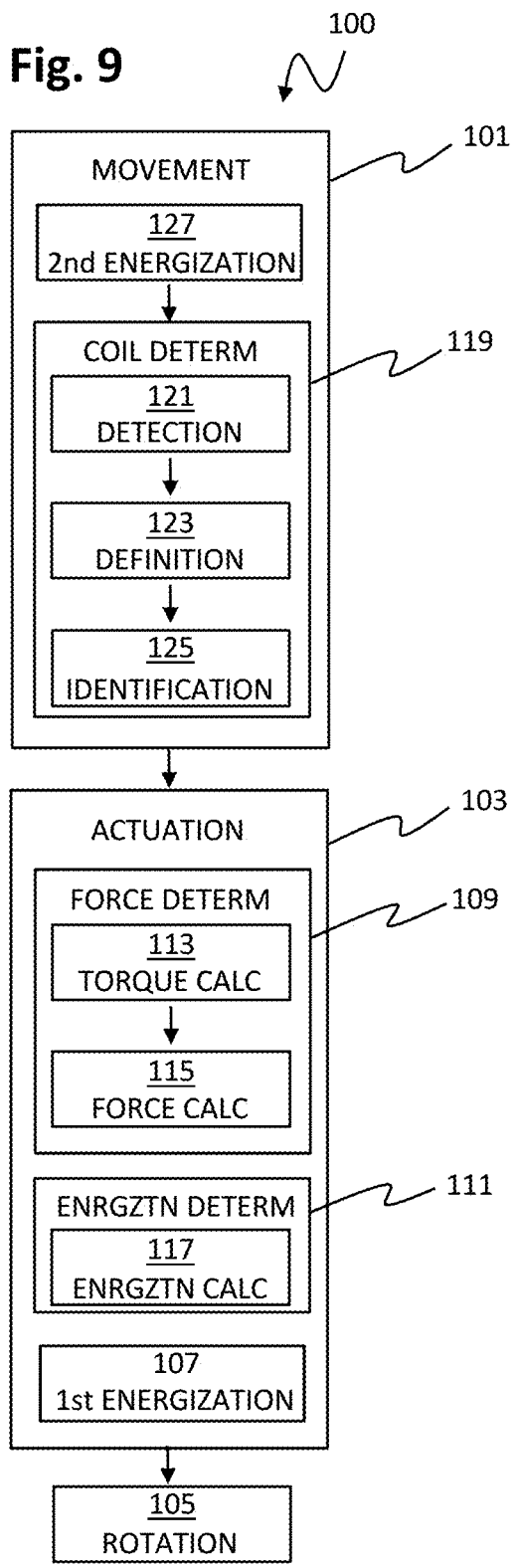
FIG. 9 shows another flow chart of a method for controlling a planar drive system.

For a detailed description of the method for controlling a planar drive system 200, reference is made to the description relating to FIGS. 8 and 9.

In the embodiment shown, the stator unit 300 comprises a plurality of stator modules 301 which are arranged next to one another along an X direction and a Y direction of the stator unit 300 and form a coherent planar stator surface 303 of the stator unit 300. In the embodiment shown, the stator unit 300 comprises six stator modules 301. However, the number of stator modules 301 connected to one another in a stator unit 300 should not be restricted to this and can vary as desired. Thus, a stator unit 300 can consist of only one stator module 301, but also of a plurality of connected stator modules 301 arranged in any desired way, which then form a coherent stator surface 303. In the embodiment shown, the control unit 201 is connected to each stator module 301, such that each stator module 301 can be controlled individually. Due to the perspective representation, not all connections to all stator modules 301 are visible in FIG. 1.

Figure 3:
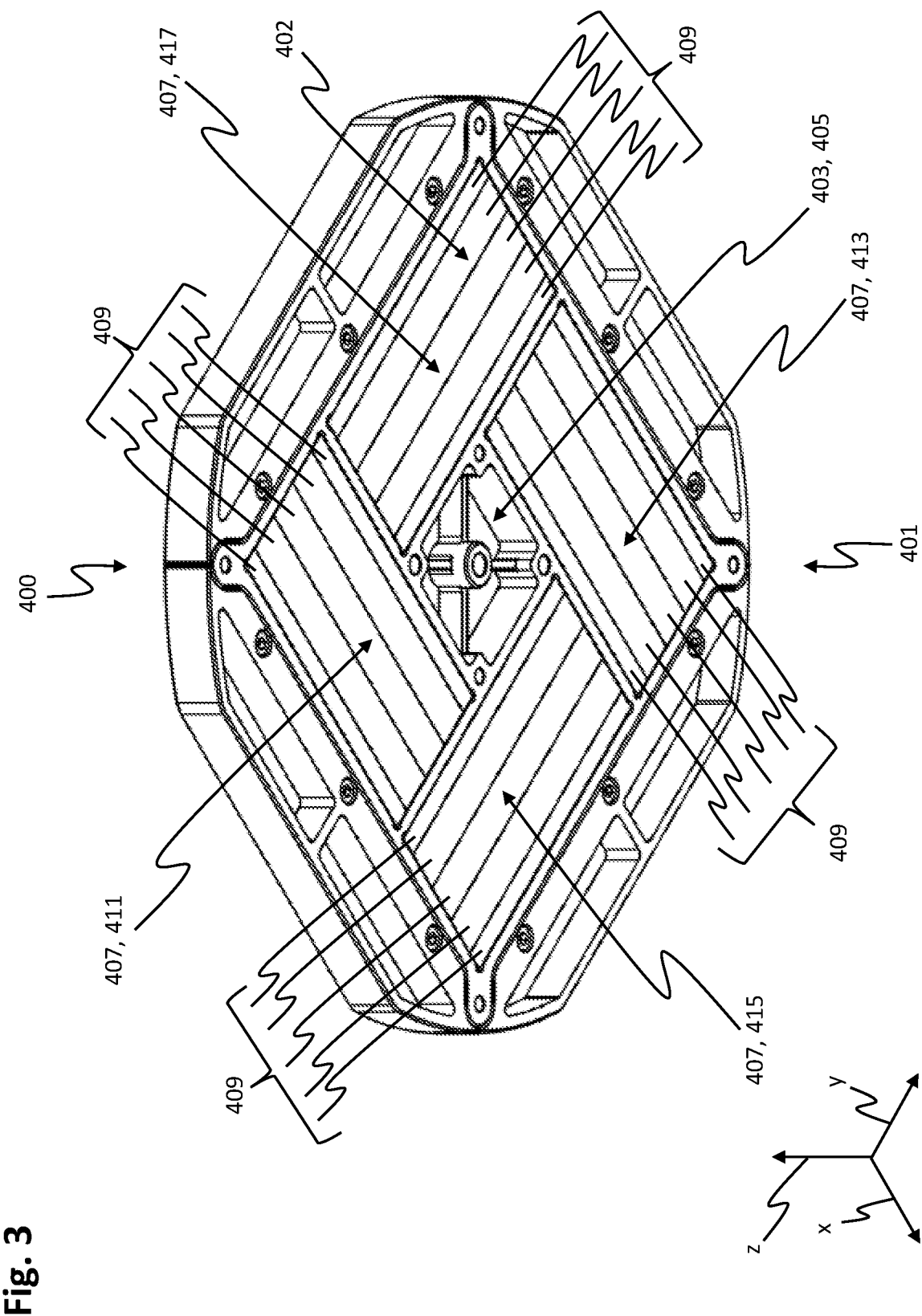
FIG. 3 shows a schematic representation of an bottom side of a rotor.

Each of the stator modules 301 has four stator segments 308. Each stator segment includes X coil groups and Y coil groups oriented along the X direction or the Y direction, respectively. Reference is made to FIG. 3 for a detailed description of the coil groups.

In the embodiment shown, the stator segments 308 are of square design and are arranged flush with one another along the X direction and the Y direction. Each stator segment 308 comprises a plurality of stator conductors 309 which can be energized and which are combined in the coil groups as described in relation to FIG. 4 and are oriented along the X direction or along the Y direction. Stator magnetic fields can be generated by energizing the stator conductors 309 of the coil groups. Via a magnetic coupling between the stator magnetic fields and a rotor magnetic field of the rotor 400, the rotor 400 can be moved in a floating manner at least along the X direction, the Y direction or a combined XY direction over the stator surface 303. Movement of the rotor 400 is also possible in a Z direction oriented perpendicularly to the X direction and to the Y direction. In this way, the distance between rotor 400 and stator surface 303 can be varied, e.g. rotor 400 can be raised or lowered above stator surface 303.

The stator modules 301 each have a stator module housing 305 in which control electronics for actuating the stator module 301 are arranged. Furthermore, magnetic field sensors for detecting the rotor magnetic field of the rotor 400 are arranged in the stator module housing 305. Each stator module 301 has corresponding connection lines 307 for supplying power and data to the control electronics.

Figure 2:
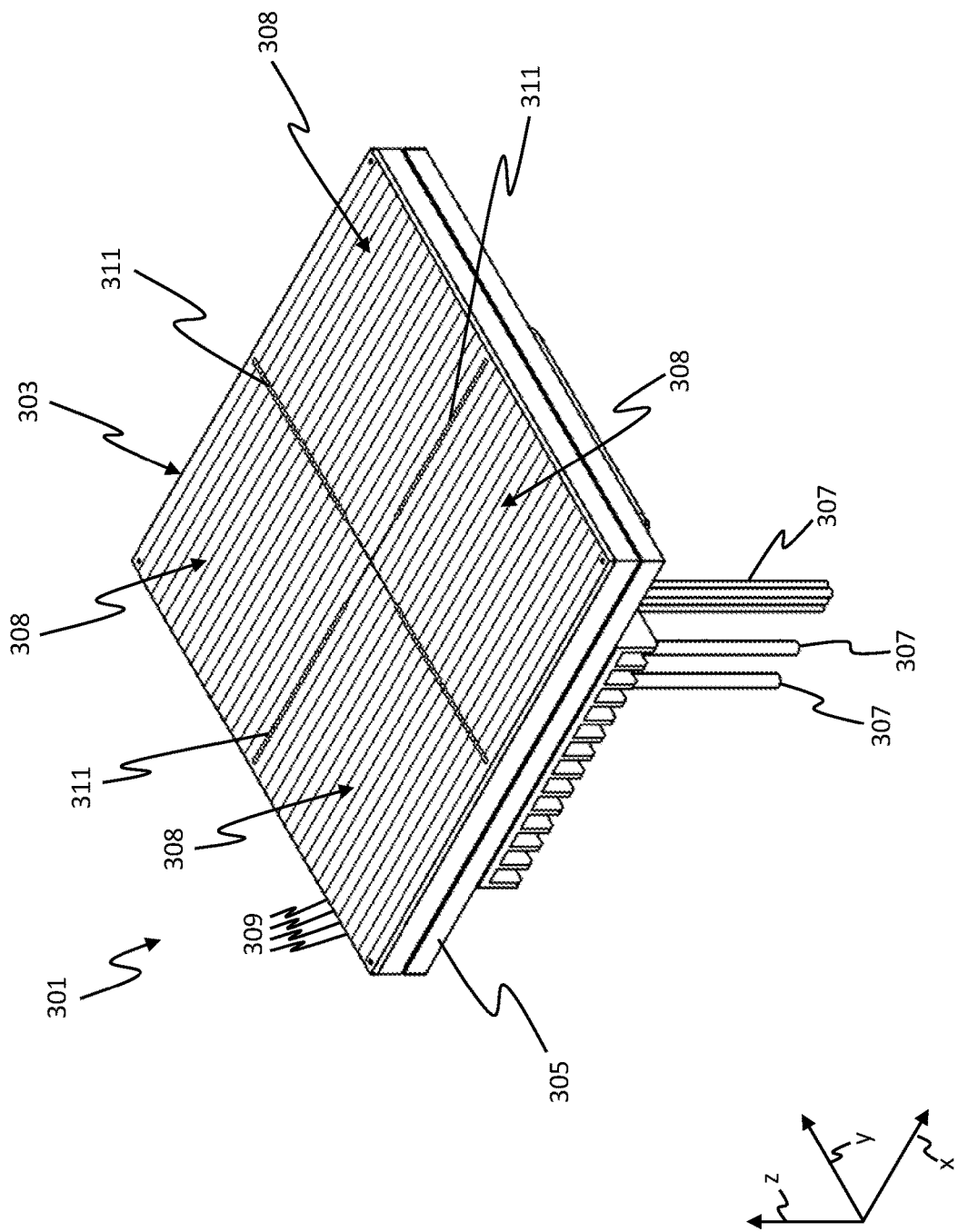
FIG. 2 shows a schematic representation of a stator module of the stator unit in FIG. 1.

FIG. 2 shows a schematic view of a stator module 301 of the stator unit 300 from FIG. 1.

The stator module 301 comprises four stator segments 308 with stator conductors 309 oriented along the X direction. The stator conductors 309 can be arranged electrically insulated from one another. The four stator segments 308 are square and form a square stator surface 303. The stator segments 308 are separated by a contact structure 311 which enables the stator conductor 309 to be connected to the control electronics and enables the stator unit 300 to be constructed in a compact manner.

FIG. 3 shows a schematic representation of a bottom side of a rotor 400 from FIG. 1 according to an embodiment.

During operation of the planar drive system 200, the bottom side of the rotor 400 faces the stator surface 303 of the stator unit 300. The rotor 400 has a magnet arrangement 401 with four magnet units 407 on the bottom side, i.e., a first X magnet unit 411, a second X magnet unit 413, a first Y magnet unit 415, and a second Y magnet unit 417. Each magnet unit 407 in turn has a plurality of magnet elements 409. In the embodiment shown, each magnet unit 407 has five magnet elements 409 which are designed as rectangular, elongate elements. For example, the magnet units 407 can each be designed as a Halbach array magnet unit. The magnet arrangement 401 is configured to generate the rotor magnetic field of the rotor 400, by which a magnetic coupling with the stator magnetic fields of the stator unit 300 can be achieved. A control or a movement of the rotor 400 relative to the stator unit 300 can be achieved the magnetic coupling.

In the embodiment shown, the first X magnet unit 411 and the second X magnet unit 413 are each oriented parallel to an X direction of the rotor 400, while the first Y magnet unit 415 and the second Y magnet unit 417 are oriented along a Y direction. When in operation, the first and second X magnet units 411, 413 drive the rotor 400 along the Y direction of the rotor 400, and the first and second Y magnet units 415, 417 drive the rotor 400 in the X direction. In addition, the magnet units 407 are used for driving in a Z direction oriented perpendicular to the X direction and to the Y direction.

In the center of the magnet arrangement 401, the rotor 400 can have an open area 403 which is not covered by magnets of the magnet arrangement 401. The rotor 400 can have a fastening structure 405 in the range of the open area 403.

Figure 4:
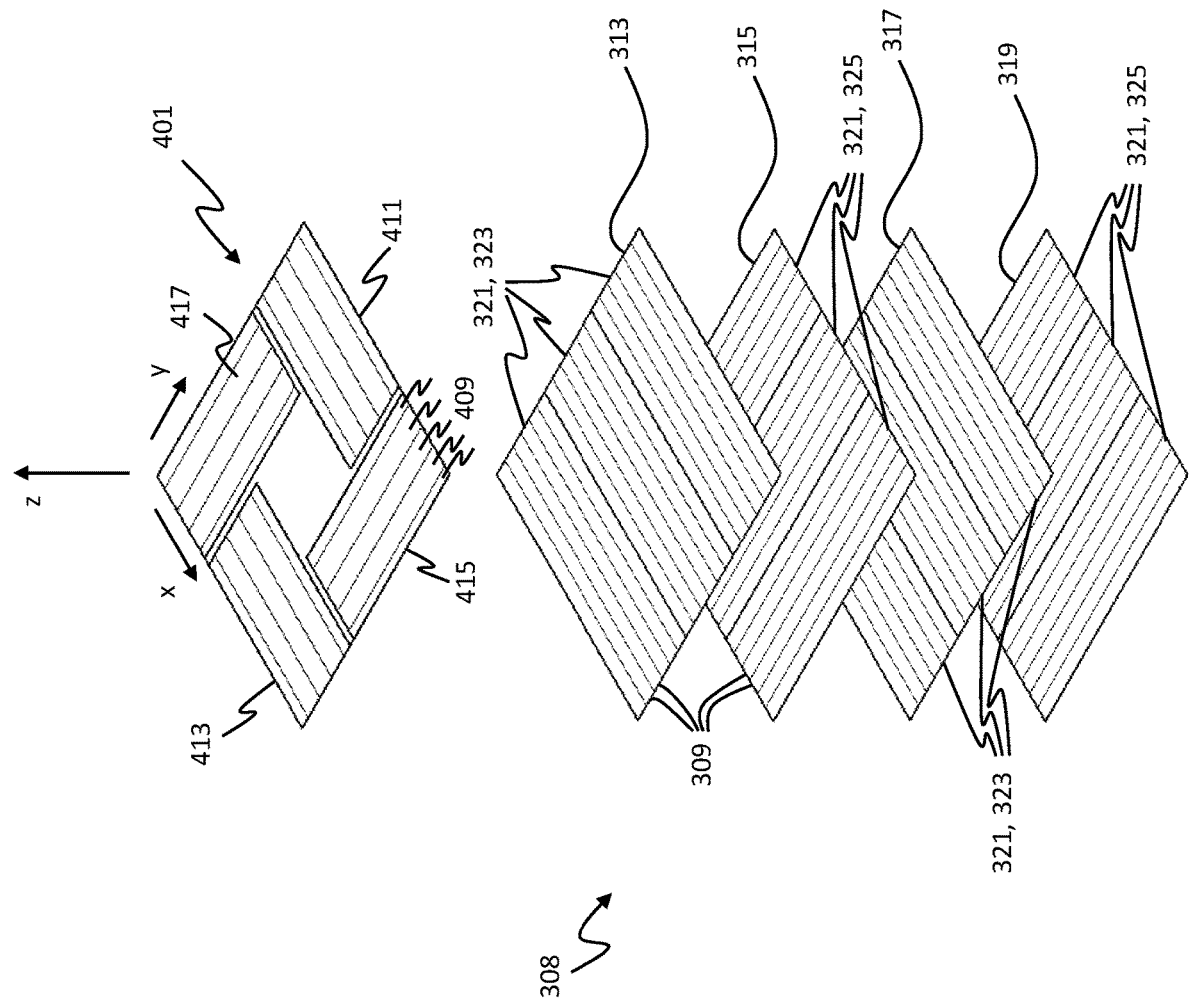
FIG. 4 shows a schematic exploded view of a stator segment of the stator unit and a magnet arrangement of the rotor in FIG. 1.

FIG. 4 shows a schematic exploded view of a stator segment 308 of the stator unit 300 and a magnet arrangement 401 of the rotor 400 from FIG. 1. FIG. 4 shows a perspective plan view of the rotor 400, which in relation to the representation in FIG. 3 is a view rotated counterclockwise by 90° about the Z axis.

Four separate stator layers are shown in FIG. 4, each of which is part of the stator segment 308.

According to the embodiment shown, the stator segment 308 has a first stator layer 313, a second stator layer 315, a third stator layer 317, and a fourth stator layer 319 arranged one above the other in the Z direction. The first stator layer 313 exclusively comprises stator conductors 309, which extend in the X direction and are arranged next to one another in the Y direction. The stator conductors 309 of the first stator layer 313 correspond to the stator conductors 309 shown in FIGS. 1 and 2, which are arranged on the stator surface 303. The stator conductors 309 of the other stator layers are arranged below the first stator layer 313 in the Z direction and are therefore in FIGS. 1 and 2.

The second stator layer 315 comprises stator conductors which are arranged perpendicular to the stator conductors 309 of the first stator layer 313, which extend in the Y direction and are arranged next to one another in the X direction.

The first and second stator layers 313, 315 are repeated in the third and fourth stator layers 317, 319, such that stator conductors extending alternately in the X direction and in the Y direction are arranged in the four stator layers of the stator segment 308 shown. The design of the stator segment 308 is an example of the stator segments 308 shown in FIGS. 1 and 2, which also have the configuration shown in FIG. 4. As an alternative to the embodiment shown in FIG. 4, a stator segment 308 can also include more than four stator layers.

The stator conductors 309 of each of the first to fourth stator layers 313, 315, 317, 319 are each combined to form coil groups 321. In the embodiment shown, each stator layer 313, 315, 317, 319 comprises three coil groups 321 arranged next to one another. The first and third stator layers 313, 317 each have three X coil groups 323 oriented along the X direction, which are arranged next to one another in the Y direction. The second and fourth stator layers 315, 319 each have three Y coil groups 325 oriented along direction, which are arranged next to one another in the X direction. Each stator segment 308 thus has a plurality of X coil groups 323 and Y coil groups 325.

The six stator conductors 309 in each coil group 321 are in particular combined as a three-phase system, in which two stator conductors 309 connected to one another form one of the three phases U, V, W of the three-phase system. Appropriate energization of coil groups 321, and in particular the three-phase systems of coil groups 321, of the individual stator layers of stator segments 308 allows generation of stator magnetic fields of stator unit 300 in the form of traveling magnetic fields, by which a magnetic force is applied to the rotor 400 and, associated therewith, movement of the rotor 400 can be achieved. Alternatively, coil groups 321 of multiple stator layers can also be interconnected, such that X coil groups 323 arranged one above the other or Y coil groups 325 arranged one above the other each form a common three-phase system.

The X coil groups 323 are adapted by a corresponding energization to generate a stator magnetic field with a Z component and a Y component. The Y coil groups 325, on the other hand, are adapted to generate a stator magnetic field with a Z component and an X component. Movement of the rotor 400 in the Z direction of the stator unit 300 and in particular floating of the rotor 400 above the stator surface 303 of the stator unit 300 can be achieved via the Z component of the stator magnetic field. By contrast, movements of the rotor 400 in the X or Y direction relative to the stator unit 300 can be achieved the X or Y components of the stator magnetic field.

The rotor 400 is moved by the stator magnetic fields of the individual coil groups 321 of the stator unit 300 via magnetic coupling of the stator magnetic field(s) with the rotor magnetic field of the rotor 400. The rotor magnetic field is here generated by the X and Y magnet units of the rotor 400.

The first and second X magnet units 411, 413 of the rotor 400 are adapted in such a way that they generate a rotor magnetic field with a Z component and a Y component. The first and second Y magnet units 415, 417, on the other hand, are adapted to generate a rotor magnetic field with a Z component and an X component. In this case, the Z component is oriented along the Z direction and the X and Y components are oriented along the X and Y directions of the rotor.

A movement of the rotor in the Z direction of the stator unit 300 can be achieved via magnetic coupling of the Z components of the rotor magnetic field and the stator magnetic field when the rotor 400 according to FIG. 1 is placed on the stator unit 300.

A movement of the rotor in the X direction can be realized via magnetic coupling of the X components of the rotor magnetic field and the stator magnetic field if the rotor 400 is placed on the stator unit 300 in such a way that the X direction of the stator unit 300 and the X direction of the rotor 400 are arranged in parallel. By contrast, a movement of the rotor 400 in the Y direction can be implemented via a magnetic coupling of the Y components of the rotor magnetic field and the stator magnetic field.

During operation of the planar drive system 100, the rotor 400 can be aligned over the stator unit 300 such that the X magnet units 411, 413 are arranged parallel to the X coil groups 323 and the Y magnet units 415, 417 are arranged parallel to the Y coil groups 325. Such an orientation of the rotor 400 is shown in FIG. 4, in which the corresponding orientation of the magnet arrangement 401 of a rotor 400 relative to the coil groups 321 of the stator layers described above is indicated.

In the shown orientation of the rotor 400 relative to the stator segments 308 of the stator unit 300, a movement of the rotor 400 in the Y direction of the stator unit 300 can be achieved by energizing the X coil groups 323 of the respective stator segments 308, while movement of the rotor 400 in the X direction can be achieved by corresponding energization of the Y coil groups 325. A movement of the rotor 400 in any direction relative to the stator unit 300 can be achieved by corresponding energizing of the X and Y coil groups 323, 325. When the X and Y coil groups 323, 325 are energized together, a movement of the rotor 400 that is diagonal to the X and Y directions can be achieved.

Figure 5:
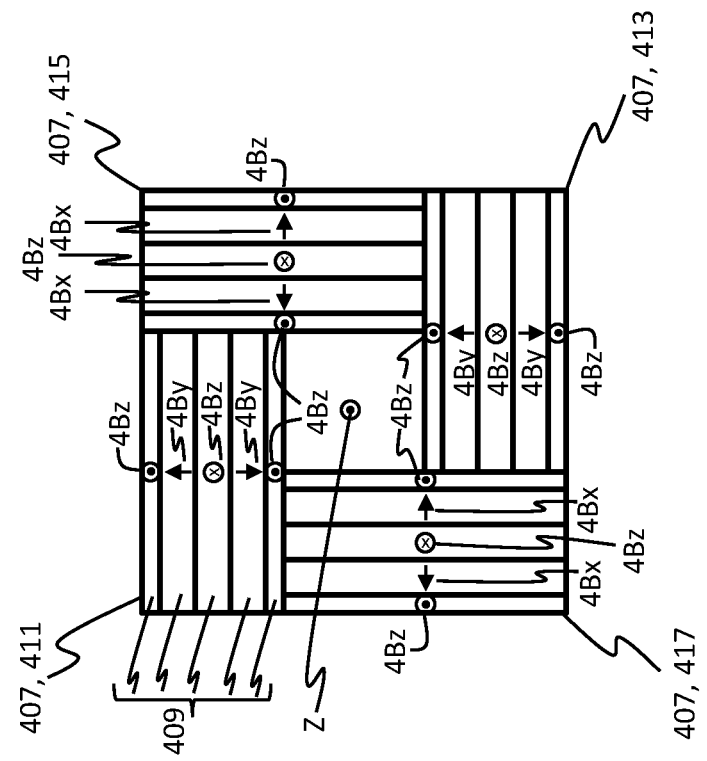
FIG. 5 shows a schematic representation of the rotor from FIG. 1.
Figure 5:
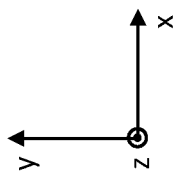

FIG. 5 shows a schematic representation of the rotor 400 from FIG. 1 in plan view, wherein only the magnet arrangement 401 with a first X magnet unit 411, a second X magnet unit 413, a first Y magnet unit 415 and a second Y magnet unit 417 is shown of the rotor 400. The plan view according to FIG. 5 shows the rotor 400 in a view rotated counterclockwise by 90° about the axis in relation to the representation in FIG. 4.

Each magnet unit 407 comprises five magnet elements 409 arranged next to one another, which elements extend along an X direction of the rotor for X magnet units 411, 413 and along a Y direction of the rotor 400 for Y magnet units 415, 417. The magnet elements 409 of the X magnet units 411, 413 are adapted here to generate a rotor magnetic field with a Z component 4BZ and a Y component 4BY. Due to the arrangement of the Y magnet units 415, 417 perpendicular to the X magnet units 411, 413, the Y magnet units 415, 417 are adapted to generate a rotor magnetic field with a Z component 4BZ and an X component 4BX.

Figure 6:
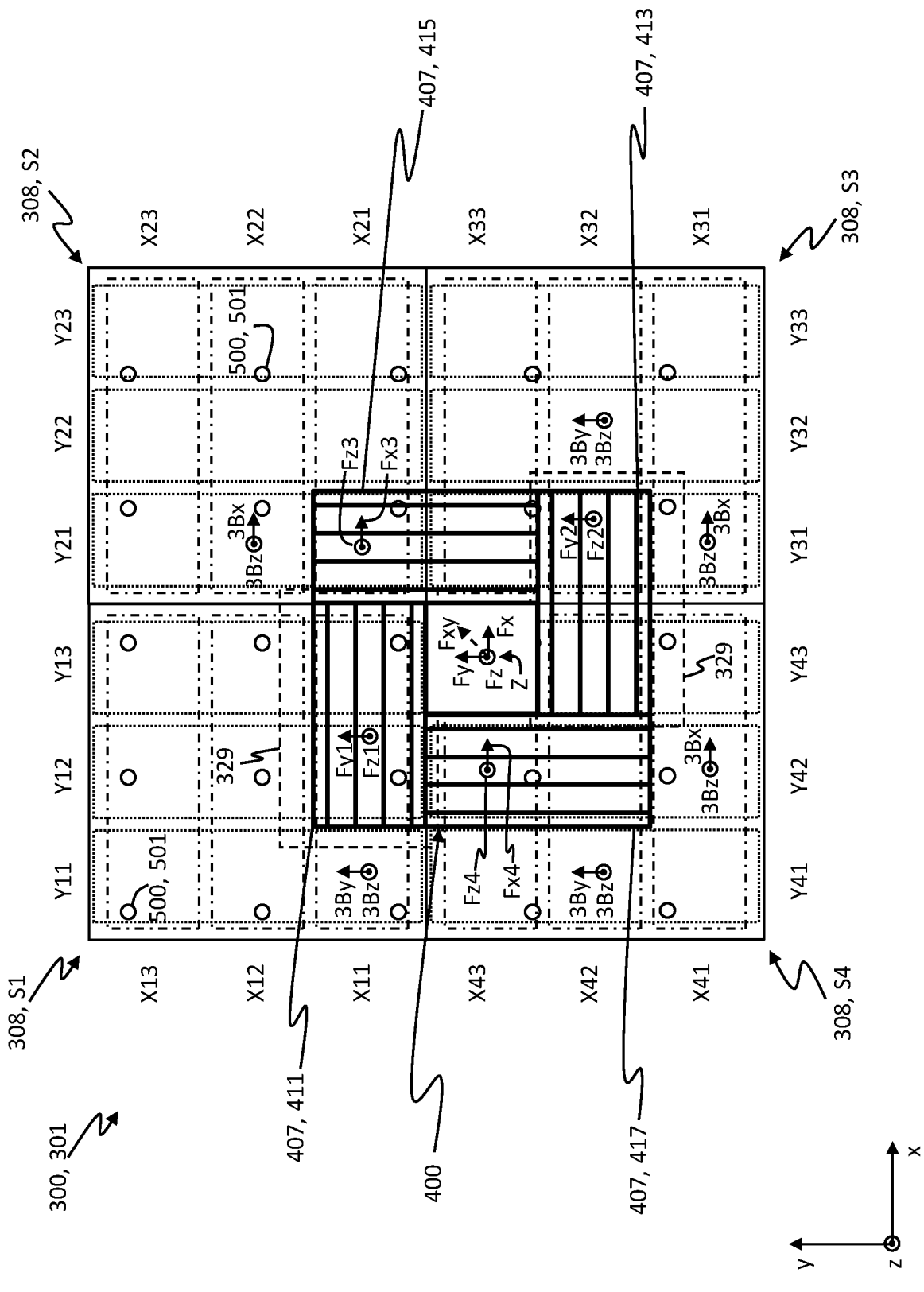
FIG. 6 shows a schematic representation of the rotor from FIG. 5 on the stator unit in a non-rotated orientation.

FIG. 6 shows a schematic representation of the rotor 400 from FIG. 5 on the stator unit 300 in a non-rotated orientation.

FIG. 6 shows a schematic plan view of a stator module 301 of a stator unit 300, wherein only four stator segments 308 arranged in a square, a first stator segment S1, a second stator segment S2, a third stator segment S3, and a fourth stator segment S4 of the stator unit 300 are shown. In addition, FIG. 6 shows the rotor 400 from FIG. 5, which is arranged on the stator unit 300, wherein once again only the magnet arrangement 401 of the rotor 400 is shown.

FIG. 6 illustrates the effect of the stator magnetic fields of the individual energized coil groups on the rotor magnetic fields of the individual magnet units 407 for a linear translational movement along the X and Y directions of the stator unit 300.

In FIG. 6, two stator layers arranged one above the other in the Z direction are shown for each stator segment 308 in analogy to what is shown in FIG. 4. Each stator layer comprises three coil groups 321 that extend over the entire length or width of the stator segment 308. In this case, analogously to FIG. 4, a stator layer comprises three X coil groups 323 or three Y coil groups 325.

In the embodiment shown, the first stator segment S1 comprises a first X coil group X11, a second X coil group X12, a third X coil group X13, a first Y coil group Y11, a second Y coil group Y12, and a third Y coil group Y13. Similarly, the second stator segment S2 comprises a first X coil group X21, a second X coil group X22, a third X coil group X23, a first Y coil group Y21, a second Y coil group Y22, and a third Y coil group Y23. The third stator segment S3 also comprises a first X coil group X31, a second X coil group X32, a third X coil group X33, a first Y coil group Y31, a second Y coil group Y32, and a third Y coil group Y33. The fourth stator segment S4 similarly comprises a first X coil group X41, a second X coil group X42, a third X coil group X43, a first Y coil group Y41, a second Y coil group Y42, and a third Y coil group Y43. To illustrate the position and alignment of the individual X coil groups 323, these are shown as dash-dot lines in FIGS. 6 and 7. To illustrate the position and alignment of the individual Y coil groups 325, these are shown as dotted lines in FIGS. 6 and 7.

The first X coil group X11 of the first stator segment S1 is arranged in line with the first X coil group X21 of the second stator segment S2. However, both X coil groups 323 are separate coil groups 321 and can be actuated separately from one another. The same applies to the second X coil group X12 of the first stator segment S1 and the second X coil group X22 of the second stator segment S2 and the third X coil group X13 of the first stator segment S1 and the third X coil group X23 of the second stator segment S2, which also can be actuated independently.

The same applies to the X coil groups 323 of the fourth stator segment S4 and the X coil groups 323 of the third stator segment S3, which can also be actuated separately.

Similarly, the Y coil groups 325 of the first stator segment S1 and the Y coil groups 325 of the fourth stator segment S4 can be actuated separately.

The Y coil groups 325 of the second stator segment S2 and the Y coil groups 325 of the third stator segment S3 can also be actuated separately.

Similarly to what has been described above, the X coil groups 323 are adapted to generate a stator magnetic field with a Z component 3Bz and a Y component 3By. The Y coil groups 325 on the other hand, are adapted to generate a stator magnetic field with a Z component 3Bz and an X component 3Bx. FIG. 6 only shows corresponding magnetic field components for selected coil groups 321 that are energized in the illustrated example for moving the rotor 400.

In the embodiment shown, the rotor 400 is arranged on the stator unit 300 in such a way that a parallel arrangement of the X magnet units 411, 413 to the X coil groups 323 and a parallel arrangement of the Y magnet units 415, 417 to the Y coil groups 325 of individual stator segments 308 of the stator unit 300 is achieved.

Due to the parallel alignment of the X magnet units 411, 413 to the X coil groups 323, a movement of the rotor 400 in the Z direction or a movement of the rotor 400 in the Y direction can be achieved by energizing the corresponding X coil groups 323 and the stator magnetic field with Z component 3Bz and Y component 3By. Due to the parallel arrangement of the Y magnet units 415, 417 to the Y coil groups 325, a movement of rotor 400 both in the Z direction and in the X direction can be achieved by corresponding energization of the respective Y coil groups 325 and the generated stator magnetic field with Z component 3Bz and X component 3Bx. In addition, a diagonally directed movement of the rotor 400 can be achieved by combined energization of X and Y coil groups 323, 325.

In the embodiment shown in FIG. 6, the first X coil group X11 of the first stator segment S1 is energized as an example of such a translational movement of the rotor. A magnetic force Fz1 in the Z direction and a magnetic force Fy1 in the Y direction act on the first magnet unit 411 arranged above the first X coil group X11 as a result of the stator magnetic field with Z component 3Bz and Y component 3By generated thereby. Furthermore, the second X coil group X32 of the third stator segment S3 is energized, such that a magnetic force in the Z direction Fz2 and a magnetic force in the Y direction Fy2 acts on the second X magnet unit 413 arranged above the second X coil group X32 by the correspondingly generated stator magnetic field with Z component 3Bz and Y component 3By. Since the second magnet unit 413 also covers the second X coil group X42 of the fourth stator segment S4 in the position of the rotor on the stator unit 300 shown, it is also actuated, such that the stator magnetic field generated thereby with Z component 3Bz and Y component 3By is added to the magnetic force acting on the second X magnet unit 413 in the Z direction Fz2 and the Y direction Fy2. The forces acting on the first and second magnet units 411, 413 in the Z or Y direction cause the rotor to move in the Z or Y direction.

In the exemplary illustration shown, the first Y coil group Y21 of the second stator segment S2 is also actuated, and a stator magnetic field with a Z component 3Bz and an X component 3Bx is thereby generated. Furthermore, the first Y coil group Y31 of the third stator segment S3 is energized, whereby a stator magnetic field with a Z component 3Bz and an X component 3Bx is also generated. The stator magnetic fields of the two first Y coil groups Y21, Y31 bring about a magnetic force acting on the first Y magnet unit 415 in the Z direction Fz3 and in the X direction Fx3. Furthermore, the second Y coil group Y42 of the fourth stator segment S4 is energized and thus a stator magnetic field with Z component 3Bz and X component 3Bx is generated, such that a magnetic force acts in the Z direction Fz4 and in the X direction Fx4 on a second Y magnet unit (417) arranged above the second Y coil group Y42. Energizing the first Y coil groups Y21, Y31 and the second Y coil group Y42 and the magnetic forces which thereby act on the first and second Y magnet units 415, 417 in the Z direction Fz3, Fz4 and the X direction Fx3, Fx4 causes the rotor to move in the Z direction or X direction.

If the X coil groups X11, X32, X42 and the Y coil groups Y21, Y31 and Y42 are energized at the same time, a diagonal XY movement of the rotor 400 can be achieved.

The totality of the magnetic forces Fz1, Fz2, Fz3, Fz4, Fy1, Fy2, Fx3, Fx4 acting on the individual magnet units 407 results in resulting forces Fx, Fy, Fz, which act on a center Z of the rotor 400.

In FIG. 6, two overlap areas 329 which are each arranged above the two X magnet units 411, 413 are also shown by dashed lines. The coil groups 321 to be energized can be selected by the overlap areas 329, in that the coil groups 321 for energizing that are arranged at least partially in the overlap area 329 are selected to act on the respective magnet units 407. In this case, the overlap area 329 describes an area of the stator unit 300 which is covered by the respective magnet unit 407. For reasons of clarity, only the overlap areas 329 of the X magnet units 411, 413 are shown in FIG. 6. Similarly to the overlap areas 329 shown, however, the Y magnet units 415, 417 also have overlap areas by which the coil groups 321 covered by the Y magnet units 415, 417 can be determined for energization.

In the embodiment shown, the stator unit 300 also has a sensor module 500 with a plurality of magnetic field sensors 501. The magnetic field sensors 501 can be configured as Hall sensors, for example, and in particular as 1D, 2D or 3D Hall sensors. In order to determine the coil groups 321 to be energized by the overlap areas 329, the stator magnetic fields of the magnet units 407 can be detected by the magnetic field sensors 501. By detecting the rotor magnetic fields of the individual magnet units 407, these can be detected and located relative to the respective magnetic field sensors 501 and thus to the stator unit 300. Based on this location, the overlap areas 329, which can be predefined in terms of shape and size, can be determined and positioned relative to the stator unit 300. The coil groups 321 at least partially arranged in the overlap areas 329 positioned in this way can thus be identified as coil groups 321 covered by the respective magnet units 407 and determined for the energization.

To move the rotor 400 in the X, Y or Z direction relative to the stator unit 300, a force Fx, Fy, Fz acting on the center Z of the rotor 400 in the respective direction is required, which can cause a corresponding movement of the rotor 400. By controlling the individual coil groups 321 and the effect of the magnetic forces on the four magnet units 407, the resultant force Fx, Fy, Fz acting on the center Z of the rotor results from the totality of the magnetic forces acting on the four magnet units 407, which are the coupling of the stator magnetic fields generated by energizing the individual coil groups.

For a rotation of the rotor 400 around one of the directions of the coordinate system spanned by the stator unit 300, corresponding torques Mx, My, Mz acting on the center Z of the rotor are required. The torques mentioned also result from the totality of the magnetic forces acting on the four magnet units 407.

$$\begin{pmatrix} F_x \\ F_y \\ F_z \\ M_x \\ M_y \\ M_z \end{pmatrix} \sim \begin{pmatrix} F_{y1} \\ F_{z1} \\ F_{y2} \\ F_{z2} \\ F_{x3} \\ F_{z3} \\ F_{x4} \\ F_{z4} \end{pmatrix} \quad (1)$$

The equation shown exemplifies a relation between the total forces Fx, Fy, Fz or torques Mx, My, Mz acting on the center of the rotor and the magnetic forces Fy1, Fy2, Fx3, Fx4, Fz1, Fz2, Fz3, Fz4 acting on the individual magnet units 407. The actual relation between the magnetic forces Fy1, Fy2, Fx3, Fx4, Fz1, Fz2, Fz3, Fz4 acting on the individual magnet units 407 and the resulting forces Fx, Fy, Fz and torques Mx, My, Mz acting on the center of the rotor 400 may depend on the actual configuration of the rotor 400, such as shape, size and weight, as well as the configuration of the magnet units 407.

The individual magnetic forces acting on the various magnet units 407 depend directly on the energized coil groups 321. In the embodiment shown in FIG. 6, in which a diagonal movement of the rotor in the XY direction is shown, the coil groups X11, Y21, X32, Y31, X42, and Y42 are correspondingly energized to generate the magnetic forces acting on the magnet units 407. This can be represented according to a relation between energization of the respective coil group 321 and a magnetic force acting on one of the magnet units 407 according to the following equation.

$$\begin{pmatrix} F_x \\ F_y \\ F_z \\ M_x \\ M_y \\ M_z \end{pmatrix} \sim \begin{pmatrix} F_{y1} \\ F_{z1} \\ F_{x2} \\ F_{z2} \\ F_{y3} \\ F_{z3} \\ F_{x4} \\ F_{z4} \end{pmatrix} \sim \begin{pmatrix} I_{qX11} \\ I_{dX11} \\ I_{qX32} \\ I_{dX32} \\ I_{qY21} \\ I_{dY21} \\ I_{qY42} \\ I_{dY42} \end{pmatrix} \quad (2)$$

The energization of the individual coil groups is shown here as a dq current, as is usual for three-phase systems. The energization values $I_{qX,Y}$ and $I_{dX,Y}$ describe the q and d components of the excitation current of the respectively energized X and Y coil groups. In the equation shown, k describes a relation matrix which represents the relation between the energization of the coil group 321 and the magnetic force generated on the magnet unit 407 respectively covering the coil group 321. The actual relation depends directly on the respective design of the coil groups 321 and magnet units 407 and possibly on an orientation of both to one another and is not described in detail below.

The relationships shown in the equations described above can be used both for a translational and a rotary movement of the rotor 400.

Figure 7:
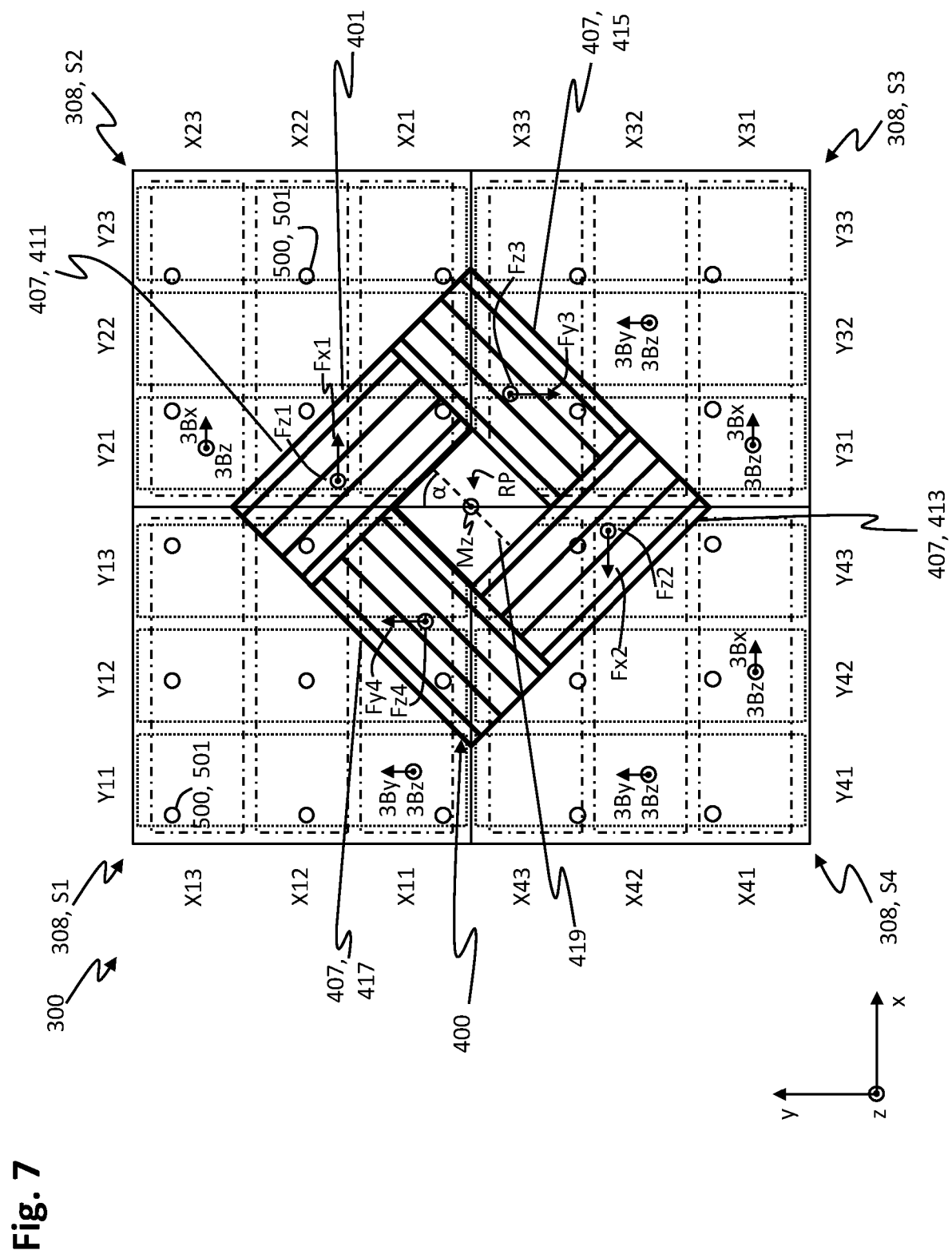
FIG. 7 shows a schematic representation of the rotor on the stator unit in a rotated orientation.

FIG. 7 shows a schematic representation of the rotor 400 from FIG. 5 on the stator unit 300 in a rotated orientation. FIG. 7 shows the rotor in the form of the magnet arrangement 401 and the stator unit from FIG. 6. Where the individual features of the magnet arrangement 401 or the stator unit 300 in FIG. 7 remain unchanged, a repeated detailed description is dispensed with.

In FIG. 7, the rotor 400 is moved to the rotational position RP. In the rotational position RP, there is a coil group 321 of the stator unit 300 which is covered exclusively by a magnet unit 407 of the rotor 400 for each orientation of the rotor 400 relative to the stator unit 300 and for each magnet unit 407.

In the embodiment shown in FIG. 7, the rotational position RP is given by the point of contact between the first to fourth stator segments S1, S2, S3, S4, in which the four stator segments 308 adjoin one another. This can be the four stator segments 308 of a single stator module 301. Where a stator unit 300 consists of a plurality of stator modules 301, the individual stator segments 308 can also be arranged in different adjacent stator modules, in which case the point of intersection of the stator segments 308 of the adjacent stator modules 301 of the stator unit 300 forms the rotational position RP.

In the embodiment shown, the rotor 400 is also rotated by 45° about the axis of rotation, which is oriented parallel to the Z axis of the coordinate system spanned by the stator unit 300. Due to this orientation of the rotor, the individual magnet units 407 have an angle of 45° to the X and Y coil groups 321, 325 of the individual stator segments 308 and at least partially cover coil groups of at least two adjacent stator segments 308. In addition, the positioning of the rotor 400 in the rotational position RP means that the coil groups 321 exclusively covered by the individual magnet units 407, which are only covered by one magnet unit 407, are each arranged in different stator segments 308 of the stator unit 300. In this context, the covering of a coil group 321 by a magnet arrangement 407 of the rotor 400 describes that the respective magnet arrangement 407 is arranged at least partially above the respective coil group 321 in the corresponding orientation of the rotor 400.

In the orientation of the rotor 400 shown, the second X coil group X22 of the second stator segment S2 is covered exclusively by the first X magnet unit 411. As can be seen from the illustration, only the first X magnet unit 411 is arranged at least partially above the second coil group X22 of the second stator segment S2 in the orientation shown. The second Y coil group Y32 of the third stator segment S3 is covered exclusively by the first Y magnet unit 415, since only the first Y magnet unit 415 is at least partially above the second Y coil group Y32 of the third stator segment S3. The second X coil group X42 of the fourth stator segment S4 is exclusively covered by the second X magnet unit 413, which is only one at least partially above the second X coil group X42 of the fourth stator segment S4. The second Y coil group Y12 of the first stator segment S1 is exclusively covered by the second Y magnet unit 417, which is the only one at least partially above the second Y coil group Y12 of the first stator segment S1.

The coil groups 321 listed here, which are exclusively covered by only one magnet unit 407, are just one example of the orientation of the rotor 400 shown in FIG. 7. For other orientations of the rotor 400, other coil groups 321 can be exclusively covered by the magnet units 407, since during the rotation of the rotor 400 about the axis of rotation oriented parallel to the Z direction, the magnet units 407 are arranged above other coil groups 321. For each orientation of the rotor 400 in the rotational position RP, however, there is a coil group 321 for each magnet unit 407, above which only one magnet unit 407 is at least partially arranged and which is therefore exclusively covered by this magnet unit.

In the embodiment shown, in which the rotational position RP is formed by the point of contact of the four stator segments S1, S2, S3, S4, the coil groups 321 exclusively covered by the four magnet units 407 are arranged in the four stator segments, exactly one coil group 321 thereof in each stator segment being exclusively covered by a magnet unit 407, which is not covered by any other magnet unit 407.

Due to the orientation of the rotor 400, not only do the individual magnet units 407 have an angle to the X and Y coil groups 323, 325, but the X and Y components of the rotor magnetic field 4Bx, 4By of the respective magnet units 407 are no longer parallel or perpendicular to the X and Y components of the stator magnetic field 3Bx, 3By of the individual coil groups 321, but also have an angle of 45° to the components of the stator magnetic field. The consequence is that stator magnetic fields both from X coil groups 323 and from Y coil groups 325 of the individual stator segments 308 can act on each magnet unit 407 and can contribute to a corresponding magnetic force acting on the respective magnet units 407.

For further rotation of the rotor 400 about the axis of rotation, the coil groups 321 covered by the individual magnet units 407 can be energized in such a way that the magnetic forces acting on the respective magnet units 407 as a whole result in a torque MZ about the axis of rotation oriented parallel to the Z axis. In the embodiment shown, the coil groups 321 are energized for this purpose, each of which acts on a magnet unit 407 and applies a corresponding magnetic force to it. The procedure is described as an example below for four coil groups 321.

In the embodiment shown, for example, the first Y coil group Y21 of the second stator segment S2 is energized, as a result of which it generates a stator magnetic field with a Z component 3Bz and an X component 3Bx. The energization of the second Y coil group Y21 thus generates a magnetic force on the first X magnet unit 411 with a Z component FZ1 and an X component Fx1 by the generated stator magnetic field. Furthermore, the third X coil group X33 of the third stator segment S3 is energized and a corresponding stator magnetic field with a Z component 3Bz and a Y component 3By is generated. As a result, a magnetic force with a Z component FZ3 and a Y component Fy3 acts on the first Y magnet unit 415. In addition, the third Y coil group Y43 of the fourth stator segment S4 is energized, and a stator magnetic field with a Z component 3Bz and an X component 3Bx is thereby generated. In this way, a magnetic force with Z component Fz2 and X component Fx2 acts on the second X magnet unit 413. Analogously, the first X coil group X11 of the first stator segment S1 is energized and a corresponding stator magnetic field with a Z component 3Bz and a Y component 3BY is generated. "Hierüber wirkt eine magnetische Kraft auf die zweite Y Magneteinheit 417 mit Komponente Fz4 and Y Komponente Fy4," which is to say, a magnetic force acts about this on the second Y magnet unit 417, with component Fz4 and Y component Fy4.

For the desired rotation of the rotor 400, clockwise in the embodiment shown, the X components or Y components of the four stator magnetic fields of the four energized coil groups 321 are directed in opposite directions, such that the X components of the magnetic forces Fx1, Fx2 acting on the X magnet units 411, 413 and the Y components of the magnetic forces Fy3, Fy4 acting on the Y magnet units 415, 417 are directed in opposite directions, respectively. The totality of the four magnetic forces acting on the individual magnet units 407 thus lead to a torque MZ about the axis of rotation arranged parallel to the axis. This allows the rotor to rotate about the axis of rotation according to an angle of rotation $\alpha$.

In FIG. 7, the angle of rotation $\alpha$ is defined by a spatial angle between a preferred direction 419 of the rotor 400 and the Y direction of the coordinate system of the stator unit 300.

In the embodiment shown, only four coil groups X11, Y21, X33, and Y43 are energized. As an alternative to this, however, a plurality of coil groups 321 can be energized in order to rotate the rotor, which are covered by the magnet units 407 of the rotor and can therefore act on the corresponding magnet units 407. In the orientation shown, for example, the first and second X coil groups X11, X22 and the second and third Y coil groups Y12, Y13 of the first stator segment S1, the first and second X coil groups X21, X22 and the first and second Y coil groups Y21, Y22 of the second stator segment S2, the second and third Y coil groups X32, X33 and the first and second Y coil groups Y31, Y32 of the third stator segment S3, and the second and third X coil groups X42, X43 and the second and third Y coil groups Y42, Y43 of the fourth stator segment S4 are energized. The individual energization of the individual coil groups 321 mentioned takes place in such a way that the totality of the magnetic forces acting on the four magnet units 407 result in the required torque MZ which enables the mover to rotate by the desired angle of rotation $\alpha$.

The energization of said coil groups 321 leads to the following relationship:

$$\begin{pmatrix} F_x \\ F_y \\ F_z \\ M_x \\ M_y \\ M_z \end{pmatrix} \sim \begin{pmatrix} F_{x1} \\ F_{z1} \\ F_{x2} \\ F_{z2} \\ F_{y3} \\ F_{z3} \\ F_{y4} \\ F_{z4} \end{pmatrix} \sim \begin{pmatrix} I_{qX11} \\ I_{dX11} \\ I_{qX12} \\ I_{dX12} \\ I_{qY12} \\ I_{dY12} \\ I_{qY13} \\ I_{dY13} \\ I_{qX21} \\ I_{dX21} \\ I_{qX22} \\ I_{dX22} \\ I_{qY21} \\ I_{dY21} \\ I_{qY22} \\ I_{dY22} \\ I_{qX32} \\ I_{dX32} \\ I_{qX33} \\ I_{dX33} \\ I_{qY31} \\ I_{dY31} \\ I_{qY32} \\ I_{dY32} \\ I_{qX42} \\ I_{dX42} \\ I_{qX43} \\ I_{dX43} \\ I_{qY42} \\ I_{dY42} \\ I_{qY43} \\ I_{dY43} \end{pmatrix} \quad (3)$$

The relationship shown, similarly to what is described for FIG. 6, represents a relationship between the individual energization of the 16 energized coil groups 321 and the magnetic forces Fx1, Fx2, Fy3, Fy4, Fz1, Fz2, Fz3, Fz4 acting on the magnet units 407 which cover the coil groups 321. When the above-mentioned 16 coil groups 321 are actuated, of which two X coil groups 323 and two Y coil groups 325 are actuated per stator segment, 32 current values result in the d-q representation, which according to the shown relationship shown lead the magnetic forces which act on the magnet units 407.

The 32 energization values required to generate the magnetic forces acting on the individual magnet units 407, which in turn lead to the torques MZ required for rotation, can be calculated or created using a corresponding simulation.

Via a simulation, for example, corresponding energization values of the individual coil groups 321 covered by the magnet units 407 can be generated directly or indirectly for different angles of rotation α and the torques MZ required therefor. The determined values can be stored, for example, in a corresponding database or look-up table, such that they can be used to control the rotor 400 and in particular can be read out from the database or the look-up table to perform a corresponding rotation of the rotor 400 by the desired angle of rotation α.

FIG. 8 shows a flow diagram of a method 100 for controlling a planar drive system 200 according to an embodiment.

The method 100 for controlling a planar drive system 200 can be applied to a planar drive system 200 according to the specific embodiments described with reference to FIGS. 1 to 7. Such a planar drive system 200 comprises a stator unit 300 with a plurality of coil groups 321 for generating one or more stator magnetic fields and a rotor 400 with a plurality of magnet units 407 for generating a rotor magnetic field. The rotor 400 on the stator unit 300 can be driven in translational or rotational movements via the magnetic coupling between the stator magnetic fields and the rotor magnetic field. As shown in the embodiments described above, the plurality of coil groups 321 may comprise X coil groups 323 formed in a rectangular shape and Y coil groups 325 formed in a rectangular shape, wherein the X coil groups 323 are aligned along an X direction of the stator unit 300 and the Y coil groups 325 are aligned along a Y direction of the stator unit 300. The magnet units 407 of the rotor 400 may also include rectangular X magnet units 411, 413 and rectangular Y magnet units 415, 417, which are aligned along the X direction and Y direction of the rotor 400, respectively.

In order to control the rotor 400 on the stator unit 300, the rotor 400 is first moved in a movement step 101 into the rotational position RP of the rotor 400 on the stator unit 300. The rotational position RP is characterized in that, in the rotational position of rotor 400, in any orientation of rotor 400 relative to stator unit 300, each magnet unit 407 of the rotor 400 covers at least one coil group 321 of the stator unit 300, which is not covered by any other magnet unit 407 of the rotor 400.

In order to move the rotor 400 in accordance with the movement step 101, the coil groups 321 covered by the magnet units 407 can be actuated and correspondingly energized according to the description relating to FIG. 6. The stator magnetic fields of the energized coil groups 321 generated in this way cause magnetic forces which act on the magnet units 407 covering the coil groups 321, wherein the totality of the magnetic forces which act on the plurality of magnet units 407 results in a total force Fx, Fy, Fz that acts on the center Z of the rotor 400, which causes a corresponding movement or a traversing motion of the rotor 400.

To move the rotor 400, the rotor 400 according to FIG. 6 is preferably arranged on the stator unit 300 in such a way that a parallel alignment of the X magnet units 411, 413 with the X coil groups 323 and a parallel alignment of the Y magnet units 415, 417 with the Y coil groups 325 is achieved.

According to the description of FIG. 6, the rotor 400 is moved by correspondingly actuating the X and Y coil groups 323, 325 covered by the X and Y magnet units 411, 413, 415, 417 of the rotor 400, wherein, given the described parallel alignment of the magnet units 407 to the corresponding coil groups 321, the actuated X coil groups 323 act on the corresponding X magnet units 411, 413 and the actuated Y coil groups 325 act on the corresponding Y magnet units 415, 417.

According to the example in FIG. 6, the rotor 400 can be moved into the rotational position RP by a diagonal movement along an XY direction. Alternatively, the rotor can be moved into the rotational position RP according to a suitable sequence of translational movements along the X direction or Y direction of the stator unit 300.

Positioning of the rotor 400 in the rotational position RP can be achieved in that the center Z of the rotor 400 is positioned in the respective rotational position RP.

To position the rotor 400 in the rotational position RP, at least the coil groups 321 that are covered by the magnet units 407 of the rotor 400 in the rotational position RP are actuated in an actuation step 103. By driving the coil groups, respective stator magnetic fields with respective X or Y components 3Bx, 3By and Z components 3Bz are generated in accordance with the description relating to FIG. 6.

By generating the corresponding stator magnetic fields of the actuated coil groups 321 and the magnetic forces acting on the magnet units 407 based on the coupling between the stator magnetic fields of the actuated coil groups 321 and the rotor magnetic fields of the respective magnet units 407, the rotor 400 is rotated in a rotation step 105 about an axis of rotation which is perpendicular to the stator surface 303 of the stator unit 300 by the predetermined angle of rotation α. The coil groups 321 covered by the magnet units 407 of the rotor 400 can be actuated according to the example described for FIG. 7.

According to an embodiment, the stator unit 300 can comprise a plurality of stator segments 308 which are each rectangular and arranged next to one another in the X and Y directions. Each stator segment 308 can in each case comprise a plurality of X coil groups 323 and Y coil groups 325, wherein the coil groups 321 of different stator segments 308 can be actuated separately from one another. The rotational position RP can be formed here by a position on the stator unit 300 in which four stator segments 308 adjoin one another. The embodiment described can be implemented, for example, according to the example in FIG. 7.

Similarly to the embodiments in FIG. 6 and FIG. 7, the X coil groups 323 can be adapted to generate a stator magnetic field having a Y component and a Z component, while the Y coil groups 325 can be adapted to generate a stator magnetic field having an X component and a Z component. The X magnet units 411, 413 can in turn be adapted to generate a rotor magnetic field having a Y component and a Z component, while the Y magnet units 415, 417 can be adapted to generate a rotor magnetic field having an X component and a Z component.

The rotor 400 can be rotated in the rotational position RP by any desired angle of rotation α between 0 and 360°.

Multiple rotations by a multiple of the angle of rotation α are also possible. A direction of rotation can also be chosen as desired.

After the end of the rotation of the rotor 400 in the rotational position RP, the rotor 400 can be moved out of the RP into other positions on the stator unit 300 by another translational movement. For this purpose, the rotor 400 in the rotational position RP can again be aligned parallel to the coil groups 321, in which alignment the magnet units 407 of the rotor 400 are each arranged parallel to the X coil groups 323 or the Y coil groups 325.

FIG. 9 shows another flow chart of the method 100 for controlling a planar drive system 200 according to another embodiment.

The embodiment of the method 100 shown in FIG. 9 is based on the embodiment in FIG. 8 and comprises all method steps described there. Insofar as these remain unchanged in the embodiment shown, a repeated detailed description will be dispensed with.

In the embodiment shown, the movement step 101 comprises an energization step 127. In order to move the rotor 400 into the rotational position RP, multiple coil groups 321 are energized with a common target energization in the energization step 127. If multiple coil groups 321 are energized together with the common target energization, the respective coil groups are supplied with an identical excitation current. The individual coil groups 321 can thus be actuated individually, but receive identical energization values for actuation, as a result of which the common desired energization is given.

In the embodiment shown in FIG. 6, for example, the first X coil group X11 of the first stator segment S1, the second X coil group X32 of the third stator segment S3, and the second X coil group X42 of the fourth stator segment S4 can be energized with an identical target current for the common current supply. The first and second X magnet units 411, 413 are actuated by the aforementioned X coil groups X11, X32, and X42, and a magnetic force is generated in the Y and Z directions. Alternatively or additionally, the first Y coil group Y21 of the second stator segment S2, the first Y coil group Y31 of the third stator segment S3, and the second Y coil group Y42 of the fourth stator segment S4 can also be energized with a common target current supply. The first and second Y magnet units 415, 417 are actuated by the aforementioned Y coil groups Y21, Y31, and Y42, and an X movement of the rotor 400 is thereby brought about. For the described linear translational movement of the rotor 400, the X coil units by which the corresponding X magnet units 411, 413 are actuated can thus be energized with an identical target energization, while the respective Y coil units by which the Y magnet units 415, 417 can be actuated with a corresponding additional common target energization, i.e., with identical excitation currents.

Alternatively, the first X coil group X11 of the first stator segment S1 and the second X coil group X32 of the third stator segment S3 and the second X coil group X42 of the fourth stator segment S4 can be energized individually. The same applies to the above-mentioned first Y coil group Y21 of the second stator segment S2, the first Y coil group Y31 of the third stator segment S3, and the second Y coil group Y42 of the fourth stator segment S4. However, common energization can take place for coil groups of different stator layers arranged one above the other. For example, first X coil groups X11 of the first stator segment S1 of the first stator layer 313 and the third stator layer 317 can be energized together, as shown in FIG. 4. The same applies to the second X coil group X32 of the third stator segment S3 and the second X coil group X42 of the fourth stator segment S4 and, if applicable, to the Y coil groups mentioned above, which are also energized together with corresponding coil groups of the third stator layer 317. Alternatively, coil groups 321 arranged one above the other can be supplied with current from more than two stator layers arranged one above the other with a common desired energization.

In the embodiment shown, the movement step 101 also comprises a coil determination step 119, in which the coil groups 321 that are covered by the magnet arrangements 407 of the rotor 400 are determined.

The coil groups 321 to be energized to control the rotor 400 can be selected in the coil determination step 119, both for the linear movement of the rotor 400 according to the example shown in FIG. 6 and for the rotation of the rotor 400 according to the example shown in FIG. 7.

To determine the coil groups 321 covered by the magnet units, the rotor magnetic fields of the individual magnet units 407 of the rotor 400 are detected by magnetic field sensors 501 of the stator unit 300 in a detection step 121.

Based on this, in a definition step 123, overlap areas 329 are defined for the magnet units 407 of the rotor 400 which identify regions of the stator unit 300 for which the rotor magnetic field of the respective magnet unit was detected by the corresponding magnetic field sensors 501.

Based on the defined overlap areas 329, the coil groups 321 to be covered by the respective magnet units 407 of the rotor 400, which are at least partially arranged in the previously defined overlap areas 329, are determined in an identification step 125.

The overlap areas 329 can be formed in accordance with the overlap areas shown in FIG. 6. Deviating from FIG. 6, in which only overlap areas 329 for the X magnet units 411, 413 are shown for reasons of clarity, corresponding overlap areas 329 can be defined for all magnet units 407.

The rotor magnetic fields of the individual magnet units 407 can thus be detected for the rotor 400 in a specific position on the stator unit 300 via the corresponding magnetic field sensors 501 of the sensor module 500 of the stator unit 300. Due to the different alignments of the rotor magnetic fields of the X magnet units 411, 413 and the Y magnet units 415, 417, the rotor magnetic fields can be assigned to the individual magnet units 407 by the measurements of the magnetic field sensors 501. Positions of the individual magnet arrangements 407 relative to the stator unit 300 can be determined by the measurements of the magnetic field sensors 501. Based on this, the overlap area 329 can be defined for each detected magnet arrangement 407, wherein a spatial area of the stator unit 300 is defined for this purpose in which the position of the respective magnet arrangement 407 is arranged. The shape and size of the individual overlap areas 329 can also differ from the rectangular shape shown in FIG. 6.

The coil groups 321, which are each at least partially arranged in the previously defined spatial area 329, can subsequently be determined as being covered by the respective magnet unit 407 and, if necessary, can be actuated to control the rotor 400 and energized correspondingly.

In the embodiment shown, the actuation step 103 also comprises a first energization step 107. In the first energization step 107, the coil groups 321 covered by the magnet units 407 of the rotor 400 in the rotational position RP are individually energized. Individual energization of the coil groups 321 covered by the magnet units 407 includes the energization of the individual coil groups 321 which differ from one another in at least one value. As already described in the embodiment in FIG. 7, coil groups 321 covered by the magnet units 407 are actuated and energized in such a way that the total magnetic forces acting on the respective magnet units 407 lead to a torque MZ that leads to a desired rotation of the rotor 400.

As already mentioned in the description there, the embodiment in FIG. 7 is an example shown solely for purposes of illustration, in which only a minimal number of coil groups 321 are energized compared to a real actuation. As an alternative, four coil groups 321 per stator segment 308 can be energized, for example, two X coil groups and two Y coil groups each, such that a total of 16 coil groups are energized for the rotation of rotor 400 in such a way that the entirety of the magnetic forces acting on the four magnet units 407 lead to a torque MZ of the rotor 400. The energization of the individual coil groups results, among other things, from the actual orientation of rotor 400 and the angle of rotation α of the desired rotation of rotor 400.

In order to determine the energization of the individual coil groups 321 required to rotate the rotor 400 by the desired angle of rotation α, actuation step 103 also comprises a force determination step 109. In force determination step 109, the magnetic force is determined for each magnet unit 407, which acts on the respective magnet unit 407 through a stator magnetic field of a coil group 321 covered by the respective magnet unit 407.

For this purpose, the torque MZ required for a rotation of the rotor 400 by the desired angle of rotation α and acting on the center Z of the rotor 400 is calculated in a torque calculation step 113, which torque is suitable for causing a corresponding rotation of the rotor 400. The calculation can be performed based on the individual properties of the rotor 400, such as the weight, size, or load of the rotor 400.

Subsequently, the plurality of magnetic forces that act on the individual magnet units 407 of the rotor 400 and that together lead to the torque MZ of the rotor 400 are calculated in a force calculation step 115. The magnetic forces acting on the magnet units 407 can in turn be calculated based on the properties of the rotor 400 and on the properties of the individual rotor magnetic fields of the magnet units 407.

After the magnetic forces acting on the individual magnet units 407 required to rotate rotor 400 through the desired angle of rotation α have been determined in force determination step 109, the individual energizations of the individual coil arrangements 321 covered by magnet units 407 are determined in a current flow determination step 111, with which the covered coil arrangements 321 are to be energized in order to allow the required magnetic forces to act on the respective magnet units 407, which lead to the torque MZ required for the desired rotation.

For this purpose, the energization values of the coil groups 321 to be energized that are required to generate the magnetic forces are calculated in an energization calculation step 117.

This calculation of the individual energizations of the coil groups 321 to be energized can be carried out, for example, by the control unit 201 of the planar drive system 200 during control of the rotor 400 and thus during the rotation of the rotor 400. The above-described relation between the energization values of the individual coil groups 321 and the generated magnetic force on the various magnet units 407 can be taken into account for the calculation.

Alternatively or additionally, a corresponding simulation can be carried out for the calculation in the energization calculation step 117 of the individual energizations of the coil groups 321 required to generate the calculated magnetic forces. The values generated from the simulation can be stored in a corresponding database or look-up table, for example. In order to control the rotor 400 and in particular to rotate the rotor 400 by a desired angle of rotation α, the corresponding values from the database or the look-up table can thus be read in by the control unit 201.

Based on current values calculated as described above, the coil groups 321 selected in the coil determination step 119 can then be correspondingly energized in the first energization step 107.

The four stator segments 308 adjoining one another in the rotational position RP can be four stator segments of a stator module 301. Alternatively, the four stator segments 308 can each be distributed in pairs over two adjacent stator modules 301. Alternatively, the four stator segments 308 can each be stator segments 308 of four different stator modules 301 adjacent to one another.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

List of reference numerals

| | |
|---|---|
| 100 method of controlling a planar propulsion system | |
| 101 movement step | 311 contact structure |
| 103 actuation step | 313 first stator layer |
| 105 rotation step | 315 second stator layer |
| 107 first energization step | 317 third stator layer |
| 109 force determination step | 319 fourth stator layer |
| 111 energization determination step | 321 coil group |
| 113 torque calculation step | 323 X coil group |
| 115 force calculation step | 325 Y coil group |
| 117 energization calculation step | 327 contact structure |
| 119 coil determination step | 329 overlap area |
| 121 detection step | 400 rotor |
| 123 definition step | 401 magnet arrangement |
| 125 identification step | 402 running surface |
| 127 second energization step | 403 open space |
| 200 planar drive system | 405 mounting structure |
| 201 control unit | 407 magnet unit |
| 203 data connection | 409 magnetic element |
| 300 stator unit | 411 first X magnet unit |
| 301 stator module | 413 second X magnet unit |
| 303 stator surface | 415 first Y magnet unit |
| 305 stator module housing | 417 second Y magnet unit |
| 307 connection line | 419 preferred rotor direction |
| 308 stator segment | 500 sensor module |
| 309 stator conductor | 501 magnetic field sensor |
| S1 first stator segment | S2 second stator segment |
| S3 third stator segment | S4 fourth stator segment |

TABLE 2

List of coil group reference symbols

| | |
|---|---|
| X11 first X coil group of the first stator segment | Y11 first Y coil group of the first stator segment |
| X12 second X coil group of the first stator segment | Y12 second Y coil group of the first stator segment |

TABLE 2-continued

List of coil group reference symbols

| | |
|---|---|
| X13 third X coil group of the first stator segment | Y13 third Y coil group of the first stator segment |
| X21 first X coil group of the second stator segment | Y21 first Y coil group of the second stator segment |
| X22 second X coil group of the second stator segment | Y22 second Y coil group of the second stator segment |
| X23 third X coil group of the second stator segment | Y23 third Y coil group of the second stator segment |
| X31 first X coil group of the third stator segment | Y31 first Y coil group of the third stator segment |
| X32 second X coil group of the third stator segment | Y32 second Y coil group of the third stator segment |
| X33 third X coil group of the third stator segment | Y33 third Y coil group of the third stator segment |
| X41 first X coil group of the fourth stator segment | Y41 first Y coil group of fourth stator segment |
| X42 second X coil group of the fourth stator segment | Y42 second Y coil group of the fourth stator segment |
| X43 third X coil group of the fourth stator segment | Y43 third Y coil group of the fourth stator segment |

TABLE 3

List of magnetic field reference symbols

RP rotation position
Z center of the rotor    $\alpha$ angle of rotation

| | |
|---|---|
| $F_x$ X component of the magnetic force on the rotor | $M_x$ X component of the rotor torque |
| $F_y$ Y component of the magnetic force on the rotor | $M_y$ Y component of the rotor torque |
| $F_z$ Z component of the magnetic force on the rotor | $M_z$ Z component of the rotor torque |
| $3B_x$ X component of the magnetic field of a coil group | $4B_x$ X component of the magnetic field of a magnet unit |
| $3B_y$ Y component of the magnetic field of a coil group | $4B_y$ Y component of the magnetic field of a magnet unit |
| $3B_z$ Z component of the magnetic field of a coil group | $4B_z$ Z component of the magnetic field of a magnet unit |
| $F_{x1}$ X component of the magnetic force on magnet unit | $F_{x3}$ X component of the magnetic force on magnet unit |
| $F_{y1}$ Y component of the magnetic force on magnet unit | $F_{y3}$ Y component of the magnetic force on magnet unit |
| $F_{z1}$ Z component of the magnetic force on magnet unit | $F_{z3}$ Z component of the magnetic force on magnet unit |
| $F_{x2}$ X component of the magnetic force on magnet unit | $F_{x4}$ X component of the magnetic force on magnet unit |
| $F_{y2}$ Y component of the magnetic force on magnet unit | $F_{y4}$ Y component of the magnetic force on magnet unit |
| $F_{z2}$ Z component of the magnetic force on magnet unit | $F_{z4}$ Z component of the magnetic force on magnet unit |

The invention claimed is:

1. A method for controlling a planar drive system, wherein the planar drive system comprises:
a stator unit with a plurality of coil groups for generating a stator magnetic field, and
a rotor with a plurality of magnet units for generating a rotor magnetic field,
wherein the rotor is drivable on the stator unit via magnetic coupling between the stator magnetic field and the rotor magnetic field,
wherein the plurality of coil groups comprises rectangular X coil groups and rectangular Y coil groups, wherein the X coil groups are aligned along an X direction of the stator unit and the Y coil groups are aligned along a Y direction of the stator unit that is perpendicular to the X direction of the stator unit,
wherein the plurality of magnet units of the rotor comprises rectangular X magnet units and rectangular Y magnet units, wherein the X magnet units are aligned along an X direction of the rotor, and wherein the Y magnet units are aligned along a Y direction of the rotor that is perpendicular to the X direction of the rotor; and
wherein the method comprises:
moving the rotor to a rotational position of the rotor on the stator unit in a movement step, wherein, in the rotational position, each magnet unit of the rotor covers a coil group of the stator unit which is not covered by any other magnet unit of the rotor in each orientation of the rotor relative to the stator unit;
actuating the coil groups which are covered by the magnet units of the rotor in the rotational position and generating a stator magnetic field by each actuated coil group in an actuation step; and
rotating the rotor about an axis of rotation that is oriented perpendicular to a stator surface of the stator unit by a predetermined angle of rotation by way of the stator magnetic fields of the actuated coil groups covered by the magnet units of the rotor in a rotation step.

2. The method according to claim 1,
wherein the stator unit comprises a plurality of stator segments, wherein the stator segments are rectangular and are arranged in pairs next to one another in the X direction or Y direction,
wherein each stator segment comprises respective X coil groups and Y coil groups separated from other X coil groups and Y coil groups of other stator segments, and
wherein the rotational position is a position on the stator assembly in which four stator segments are adjacent to one another.

3. The method according to claim 1, wherein the actuation step comprises:
energizing each of the coil groups covered by the magnet units by individual energization in a first energization step.

4. The method according to claim 3, wherein the actuation step comprises:
determining a magnetic force which acts on a magnet unit of the magnet units covering a coil group of the coil groups by a stator magnetic field of said coil group in a force determination step; and
determining an individual energization for each of the coil groups covered by the magnet units in an energization determination step, such that a torque of the rotor about the axis of rotation is generated by a totality of the magnetic forces acting on the magnet units by the stator magnetic fields according to the individual energization of the coil groups, which torque is adapted to cause rotation of the rotor by the angle of rotation.

5. The method according to claim 4, wherein the force determination step comprises:
calculating the torque required for the rotation by the predetermined rotation angle in a torque calculation step; and
calculating the magnetic forces required to generate the torque and acting on individual magnet units of the rotor in a force calculation step; and
wherein the energization determination step comprises:

calculating of the individual energizations of the coil groups required to generate the calculated magnetic forces in an energization calculation step.

6. The method according to claim 5, wherein the calculations of the torque and the forces in the force determination step and of the energizations in the energization determination step are performed by a control unit of the planar drive system during the control of the rotor.

7. The method according to claim 5,
wherein the calculations of the torque and/or the forces in the force determination step and/or the energizations in the energization determination step comprise simulations,
wherein the simulations are based on a model description of a relationship between energization of the coil groups and magnetic forces acting on the magnet units, and/or on a model description of a relationship between the energization of the coil groups and the torque acting on the rotor.

8. The method according to claim 1, wherein the movement step comprises:
determining the coil groups of the stator unit which are covered by the magnet units of the rotor in a coil determination step.

9. The method according to claim 8, wherein the coil determination step comprises:
detecting the rotor magnetic fields of individual magnet units of the rotor by magnetic field sensors of the stator unit in a detection step;
defining an overlap area for each magnet unit in a definition step, wherein the overlap area identifies an area of the stator unit that includes the magnetic field sensors detecting the rotor magnetic field of the respective magnet unit; and
identifying the coil groups that are at least partially arranged in an overlap area in an identification step.

10. The method according to claim 1, wherein the movement step comprises:
energizing a plurality of the coil groups with a common target energization in a second energization step.

11. The method according to claim 2,
wherein the rotor comprises two of said X magnet units and two of said Y magnet units, wherein the two X magnet units are arranged in the Y direction on opposite sides of the rotor and the two Y magnet units are arranged in the X direction on opposite sides of the rotor, and
wherein at least four of the coil groups are covered by the magnet units in the rotational position, and wherein each of the at least four coil groups is arranged in a respective stator segment.

12. The method according to claim 1, wherein the angle of rotation is selectable for any value between 0° and 360°.

13. The method according to claim 1,
wherein an X coil group of the X coil groups is adapted to generate a stator magnetic field with a Y component and a Z component,
wherein a Y coil group of the Y coil groups is adapted to generate a stator magnetic field with an X component and a Z component, wherein an X component is aligned along the X direction, a Y component is aligned along the Y direction, and a Z component is aligned along a direction of the stator unit which is oriented perpendicular to the X direction and to the Y direction.

14. The method according to claim 1,
wherein an X magnet unit of the magnet units is adapted to generate a rotor magnetic field having a Y component and a Z component,
wherein a Y magnet unit of the magnet units is adapted to generate a rotor magnetic field having an X component and a Z component,
wherein the X component is aligned along the X direction, the Y component is aligned along the Y direction, and the Z component is aligned along a direction oriented perpendicular to the X direction and the Y direction of the rotor.

15. A planar drive system adapted to perform a method according to claim 1, comprising:
the stator unit with the plurality of coil groups for generating the stator magnetic field,
at least one such rotor with said plurality of magnet units for generating said rotor magnetic field, and
a control unit for controlling the planar drive system;
wherein the rotor is drivable on the stator unit via the magnetic coupling between the stator magnetic field and the rotor magnetic field,
wherein the plurality of coil groups comprises the rectangular X coil groups and rectangular Y coil groups, wherein the X coil groups are aligned along the X direction of the stator unit and the Y coil groups are aligned along the Y direction of the stator unit that is perpendicular to the X direction of the stator unit,
wherein the plurality of magnet units of the rotor comprises the rectangular X magnet units and rectangular Y magnet units, wherein the X magnet units are aligned along the X direction of the rotor, and wherein the Y magnet units are aligned along the Y direction of the rotor that is perpendicular to the X direction.

* * * * *